(12) United States Patent  (10) Patent No.: US 8,698,617 B2
Henson et al.  (45) Date of Patent: Apr. 15, 2014

(54) DISPLAY FOR HAND-HELD ELECTRONICS

(75) Inventors: Donald Henson, Hillsboro, OR (US);
Thaine Allison, Hillsboro, OR (US);
Jason Goldberg, Hillsboro, OR (US);
Justin Olson, Hillsboro, OR (US); Eric Pitt, Hillsboro, OR (US); Kris Schatz, Hillsboro, OR (US); Wade Wheeler, Hillsboro, OR (US)

(73) Assignee: Mobile Tech, Inc., Lake Oswego, OR (US)

( * ) Notice: Subject to any disclaimer, the term of this patent is extended or adjusted under 35 U.S.C. 154(b) by 610 days.

(21) Appl. No.: 12/819,944

(22) Filed: Jun. 21, 2010

(65) Prior Publication Data
US 2011/0309928 A1 Dec. 22, 2011

(51) Int. Cl.
*G08B 1/08* (2006.01)
(52) U.S. Cl.
USPC ..................................................... 340/539.1

(58) Field of Classification Search
USPC .......... 340/686.1, 568.2, 568.3, 571, 538.16; 248/551
See application file for complete search history.

(56) References Cited

U.S. PATENT DOCUMENTS

| | | | |
|---|---|---|---|
| 6,761,579 B2* | 7/2004 | Fort et al. ...................... | 439/501 |
| 7,015,596 B2* | 3/2006 | Pail ................................ | 307/28 |
| 7,209,038 B1* | 4/2007 | Deconinck et al. ........ | 340/568.8 |
| 7,522,047 B2* | 4/2009 | Belden et al. .............. | 340/568.1 |
| 7,667,601 B2* | 2/2010 | Rabinowitz et al. ....... | 340/568.2 |
| 7,710,266 B2* | 5/2010 | Belden et al. .............. | 340/568.3 |
| 7,724,135 B2* | 5/2010 | Rapp et al. ................. | 340/568.1 |

* cited by examiner

*Primary Examiner* — Phung Nguyen
(74) *Attorney, Agent, or Firm* — Bruce A. Kaser

(57) ABSTRACT

The invention disclosed here is a display system for managing power and security for a plurality of hand-held electronic devices sold to consumers in a retail location. The display includes features that allow power to be supplied to individual devices without hard wiring or multi-conductor retractor cables. The display also allows for individual security alarms to be triggered when a theft occurs. Security alarm conditions are triggered via wireless signals.

7 Claims, 24 Drawing Sheets

DISPLAY FOR HAND-HELD ELECTRONICS

TECHNICAL FIELD

The invention described here relates to displays that are designed to provide operating power and security against theft for hand-held electronics that are offered for sale in a retail setting.

BACKGROUND OF THE INVENTION

The business of building and servicing retail displays for hand-held electronics has developed into a sophisticated industry. "Big Box" and other large electronics retailers are the major industry customers. The typical display is a countertop-style display that involves a large number of hand-held electronic devices mounted to the countertop via posts or similar kinds of mounting structures.

Mr. Roger Leyden was an early inventor of countertop display assemblies that were initially used to mount film cameras in a retail location. U.S. Pat. No. 5,861,807 ("Leyden '807") is typical and describes a mounting body that carries a camera. The mounting body is lifted from a pedestal or similar support so that the camera can be examined by a potential purchaser. The pedestal is one of many that would be mounted to a display surface.

Mr. Leyden also utilized retractors that had one or more conductor wires feeding up to the mounting body. To put this in historical perspective, Leyden obtained several patents on display designs during a period of time before digital cameras, cell phones, and PDAs emerged in the marketplace. Security against theft was the primary issue, at the time, rather than supplying operating power to the device. Film cameras had no significant operational power requirements, for example. Therefore, Leyden '807 (as an example) tended to focus on security measures—which is still important today—although power supply to individual devices has taken on greater importance in the last decade because of how handheld technology and products have evolved.

As far as security is concerned, Leyden '807 remains a viable design from the standpoint that it describes a secondary security sensor cable coming from a mounting body that is connected to a camera. The security sensor is powered by the tether that comes up from beneath the counter. The tether provides both physical security and the electrical signal or power line necessary to drive the sensor.

Because of the large numbers of devices mounted on the modern display, tethering each one creates a cable tangling problem. Leyden may or may not have been the first to address that problem by using a cable reel as a security tether system where an alarm is triggered if the cable or secondary cable connection is severed. However, this development gave rise to the use of cable "retractors" in the industry.

As digital cameras entered the marketplace in the late '90s, along with the expanded use of cell phones and new cell phone designs, a need arose to provide operating power as well as security functionality to individual post positions on large retail displays. Other related problems developed, at the time, involving the burdens imposed on the local salesperson who needed to make power supply changes at the display when new hand-held models were swapped out with old ones, or the retailer changed its mix of brands offered for sale.

Swapping different hand-held models to and from many post positions creates a power cable management problem for the average salesperson, particularly when different hand-helds with different power fittings and voltage requirements are swapped to and from the same post position. Replacing products that have different operating voltages and power jack fittings requires ongoing changes in cabling that will be multiplied many times over according to the number of products on display. It creates a very complex situation in a retail store as inventory rotates.

As a consequence, in or about 1999-2000, a predecessor entity to Merchandising Technologies, Inc. ("MTI") developed a "universal" mounting puck that involved using a retractor that had a single voltage line connected to the puck for power supply purposes, thus eliminating the need for making power cable changes upstream of the puck's position as product models changed. In other words, the "universal" design provided a generic post position with a retractable tether where no cabling changes were needed underneath the display countertop in order to swap products to and from the post. However, the single voltage power line to the puck still remained part of a multi-conductor retractor cable that continued to have other wires in the cable that provided parallel circuits; one for power and the other for separately feeding power to security sensors (or "security signals") as per earlier designs like Leyden '807.

As part of the universal design, MTI also developed what is now known in the industry as the "Smart Cable,™" which is a short power adaptor cable that steps down the puck voltage (received from the retractor's power line wire) to meet the specific power requirements of the hand-held. When changing out products, the salesperson simply picks the correct "Smart Cable™" to match the product. Thus, attaching the product with a unique "Smart Cable™" and reattaching secondary security sensor cables (if used) became the only thing the salesperson needed to do when swapping products with the MTI design.

In or about 1998, Telefonix, Inc. designed an adaptor cable with a "modular connector" arrangement. This design multiplied the numbers of individual power wires or conductors within the retractor cable, with each one supplying a unique voltage. The design was described in U.S. Pat. No. 6,386,906 ("Burke '906").

The Burke '906 adaptor cables did allow swapping one hand-held with another to and from a post position and, in this respect, served the power requirements of different hand-helds at the same post position. However, Burke '906 was not marketable because it relies on mechanical "pin" connections to plug into specific line voltages offered by the retractor cable—that is, it had no easy way of adapting if new devices came onto the market that needed other operating voltages.

MTI's early design became the industry standard. However, while Burke '906 and MTI's early design provided different ways to deal with power supply issues for swapping out hand-helds on the display, they shared some similar technical problems that are associated with multi-conductor retractors. This issue related to "physical" security in that retailers want hand-helds to be tethered to the display in a way that makes it difficult to physically remove the hand-held regardless of whether or how many electrical security sensors are used. A typical multi-conductor retractor provides this tethering function. However, the tether is not as physically secure as the steel cable tethers that were used in the retail industry in earlier years, before the advent of electrical security sensors, like Leyden '807. Steel cable tethers fell out of use in the display industry because, obviously, they lack wiring and, therefore, the ability to conduct power and security signals to the mounting puck position.

Another problem with multi-conductor retractors lies in the wear and tear these retractors undergo during the repeated cycling that occurs as the consumer lifts and returns the puck to its original position on the display. Because the retractors are generally low voltage systems, the mechanical wear and tear sometimes alters the voltage transmitted through the wires or causes short circuits. While less of a problem today compared to ten years ago, at one point in time in the development of these products, mounted hand-helds were sensitive to relatively small voltage fluctuations in the power supply.

All of the above represents a variety of technical issues that have gone hand-in-hand with the evolution of the consumer hand-held market and the retailer's need to display powered-up products in an attractive way, while still maintaining theft against security.

There has been a long-felt need to completely eliminate multi-conductor retractors in the retail display industry. At the same time, however, retail displays need to continue to provide device power and security functionalities at the puck position.

The design improvements disclosed here provide a solution. These improvements are a continuation of past improvements developed by MTI commencing from about ten years ago.

SUMMARY OF THE INVENTION

The following is a summary of the various improvements disclosed in this document. First and foremost, this disclosure involves retail displays for large numbers of hand-held electronic devices that are intended to be offered for sale at "Big Box" retailers and similar retail outlets. A retail display of this type may be used to sell a wide variety of devices such as digital cameras, cell phones, PDAs, camcorders, hand-held GPS devices, and other types of hand-held electronics. The display is also well-adapted to display new versions or types of hand-held consumer electronic products that are likely to appear in the marketplace in the future.

While not always the case, the display improvements disclosed here will usually be implemented as part of a "countertop" display consisting of a number (or plurality) of individual product positions, called "posts" or "post positions." This involves mounting each hand-held device to the display by means of a physical post assembly or other base structure that is physically connected or mounted to the countertop. Sometimes the countertop is a flat surface, sometimes it involves stair-stepped display surfaces, or the like. In lieu of a countertop, sometimes the hand-helds are displayed on a wall rack in a retail location. Wall rack displays are more common in cell phone stores, as an example.

It is also common for displays of this kind to be connected to an under-the-counter source module. As a person skilled in the art would know, source modules provide security and power connections for individual post positions. There are many variations in the way this is done.

For the purpose of this disclosure, the term "power signal" is meant to refer to an electrical connection or electrical coupling that provides operating power to a hand-held device or another component associated with a display post position. Similarly, the term "security signal" refers to an electrical connection or electrical coupling to a security sensor, or secondary security sensor cable, or the like. These types of naming conventions are common in both the industry and patent literature relating to retail displays.

According to the improvements described here, transmission of a signal indicating a security breach is done "wirelessly." The present disclosure focuses on "wireless" security functionality as one of a group of novel features defined in the patentable claims.

Moreover, according to the improvements described here, the power supply to individual hand-helds does not necessarily involve or require a continuous and unbroken wire-to-wire cable connection between source module (or other power source) and the electronic device (which is common to display designs that use multi-conductor retractors).

More specifically, with respect to the wireless functionality described above, and referring to the Burke '906 patent as a basis for comparison (regarding security alarms), Burke '906 relies on a continuous, hard-wired electrical circuit between an under-the-counter source module and one or more security sensors via a multi-conductor retractor. In Burke '906, a hard-wired circuit is provided upstream of the hand-held mounting member by the conductors (wires) in the multi-conductor retractor, which are necessary for providing the electrical connections for security alarms. It should be mentioned that the disclosure in Burke '906 focuses on providing operating power to the hand-held. Nevertheless, Burke also describes security sensor signals and security functionalities.

As indicated above, it is common to use a pressure-type security sensor switch in the mounting member portion of a display post (the "puck") at the interface position where the hand-held is mounted to the puck. Removal of the hand-held from the interface position, for any reason, triggers a mechanical release or switch where the hand-held meets the puck.

In prior designs, this generated a detectable security breach signal via breaking the circuit defined by the hard-wired circuit connection between puck and source or control modules below the counter. Similarly, it is common to use a secondary security sensor cable that electrically couples the puck to the hand-held. Secondary sensors are used as an auxiliary to primary security sensors that are usually located at the interface between puck and hand-held. Secondary sensors are usually in the form of the type of short, secondary cable sensor that interconnects the puck and device as disclosed in Leyden's '807 patent. Either way, in past designs the security alarm signal is communicated to the source module or other security electronics below the countertop by breaking a hard-wired circuit that is necessarily created or transmitted via a multi-conductor retractor.

In contrast, here, one of the things that sets the present disclosure apart from the prior art involves the elimination of the wires between the power source and the puck, which means that multi-conductor retractors are no longer needed to tether the puck. In one preferred embodiment, this is done by substituting a mechanical reel (e.g., braided steel cable) for conventional multi-conductor retractors.

At this point it should be understood that the term "mechanical reel" specifically means a reel mechanism, other than what is known as a "multi-conductor" reel, that utilizes a steel or metallic cable, or the like, in lieu of a multi-conductor (i.e., multi-wire) retractor having individual conductor wires. A steel cable provides much better physical security than retractor cables that consist of little more than small-gauge wires. There may be other materials in lieu of steel that can provide the same level of physical security. Either way, the present disclosure is able to combine a high level of physical security (i.e., steel cable that is hard to cut) and yet provide the needed electrical power and security requirements of a modern display without hard-wired or wire-to-wire means. The way power and security is provided with a non-conducting tether is summarized below.

In the present design, the puck carries its own electronics' board or "ECB." The puck electronics resident on the ECB detect and communicate a security breach event, via wireless means, to display system control electronics that are located under the countertop or elsewhere. The wireless transmission of the security event is or may be accomplished in different ways.

One way involves communication of a security breach signal completely wirelessly by using a small transmitter or antenna located within the puck itself, and possibly, carried by the ECB. In another embodiment, the steel cable in the mechanical retractor is used as a transmitting antenna. One way of accomplishing this last functionality is to place a toroid in the base portion of the post assembly, such that the toroid surrounds a portion of the steel cable. The toroid picks up or detects changes in electromagnetic fluctuations in the cable that communicate a security breach condition (e.g., triggered by a pressure sensor on the puck or disconnection of a secondary sensor cable).

Another aspect of the present disclosure involves a cable management apparatus that operates from a single-source power supply (provided by the source module or other power source located under the countertop). This is particularly applicable if a mechanical reel is used at a post position, because the steel cable in the reel is not capable of adequately transmitting a power voltage to the puck.

Unlike prior designs in the present case, a single-source power signal provides everything that is needed to drive either the power needed to operate the hand-held device or the power needed to drive any puck electronics (once again, the puck serves as a mounting member for the hand-held).

The puck electronics will provide the security implementations and other functions that are capable of being carried out at the puck level. In the present case, therefore, a single power source line can provide all the power necessary to provide power, security, or any other electrical functions carried on at the puck level, in lieu of conventional designs that use one power line circuit to the puck for hand-held power and another power line circuit for the purpose of delivering electricity to power security sensors, which is another way of describing a "multi-conductor" retractor or the like. Also, in the present case, the single-source or single-circuit power is distributed or parceled out at the puck level to drive both hand-held power functions and any security sensors. This effectively makes the puck a generic platform location with a universal power source having been translated from a position underneath the countertop to the puck above, for both swapping hand-helds with different power requirements and changing security sensors at the puck level, as needed. Using single source power to drive both power and security at the puck level in this way is believed to be unique.

A portion of the power signal is parceled out at the puck level to the hand-held by puck electronics as a "pass through," when the puck is at rest on the display. In many cases (e.g., cell phones), the hand-held carries its own battery that is charged via the puck and then supplies operating power when the consumer lifts and operates the device at the display. In this particular situation, therefore, the "pass through" power drives the electronics in the hand-held itself and/or charges the hand-held's battery electronics in more or less the same way as an individual adaptor/charger commonly provided by the hand-held's manufacturer. At the same time, the puck serves as a universal power adaptor for any and all hand-helds to be mounted to the puck via the type of "Smart Cable™" design described above, or otherwise.

Some of the features disclosed here may be used outside the framework of tethered systems. However, while there may be tethering alternatives, in preferred form, the puck will always be mechanically tethered to the display in the manner described above.

As indicated above, there is no power or power signal delivered to the puck via the mechanical tether because it lacks conductor wires. Instead, the puck has spring contacts that mate with complementary contacts in the base portion of the post assembly where the puck normally rests. Only the base portion of the post assembly is hard-wired to the source module or other similar power source. Any power signal supplied via the power source will be supplied at the time the spring contacts electrically engage when the puck is at rest. At that same time, single-circuit power is supplied to the puck's ECB at a sufficiently high voltage and amperage to charge any type of hand-held that will be mounted to the puck and drive any security functions at the puck level.

The hand-held has a unique adaptor cable that electrically couples the hand-held to a power fitting on the puck. In order to step-down the power voltage at the puck, or otherwise adjust it to match the power requirements of the hand-held, the adaptor cable is provided with a unique key circuit that adjusts puck power to meet the needs of the hand-held. In preferred form, this is done by building a resistor circuit into the adaptor cable that matches the puck voltage to the hand-held's power requirements.

In order to facilitate the swapping of one type of hand-held with another (having different power requirements, for example), each type of hand-held will be supplied with its own unique adaptor cable having both the correct power jack fittings (if needed) and the proper resistance value to step-down the voltage available from puck electronics.

Once again, when the puck is at rest, the post assembly contacts are engaged and power passes to the puck, via the ECB, and then is passed through the hand-held's electronics with the voltage delivered to the hand-held being adjusted via the adaptor cable. In the "at rest" position, the hand-held's battery changes in the usual way that simulates being plugged into a conventional adaptor cable when the puck is lifted from the display, the post assembly contacts are broken and the hand-held is powered only by the hand-held's battery while it is examined by the consumer.

Thus, according to one variation on the present disclosure, the puck distributes power to the hand-held's internal battery when the device is at rest. As described above, when the puck is lifted, the hand-held's battery serves as the source for operating power, in the same way a consumer uses the device.

However, because security sensors are not self-powered, the ECB, or puck, as the case may be, independently carries its own battery. The puck battery is similarly charged when the puck is at rest and can drive puck electronics separately after the puck is lifted.

In yet another version, some types of hand-helds will not be displayed with their own internal batteries. In situations of this kind, in the past, the device has been powered by a line directly to the device's power jack fitting via a multi-conductor retractor. This is a common and historical implementation in the display of digital camcorders, for example. In the present case, it is possible to design the footprint of the puck so that it carries a sufficiently large battery to drive both the hand-held and other puck electronics at the same time, when the puck is in "lift" mode. Other power storage devices may be used in lieu of a battery such as, for example, a large capacitor.

As yet another alternative, it is possible to eliminate a mechanical reel and replace it with another type of tethering cable that provides the same tethering function, but without the reel that first pays out cable and then retracts it when the product is returned to the display. An example of an alternative arrangement would be a short "curly-Q" cord that has no electrical function or wires within the cord. As material technologies develop, fiber optic cables may serve as tethers where the cable transmits digital signals that are not used for power.

It is believed the customers (i.e., retailers) for the type of display disclosed here will probably always want the comfort provided by the physical security of a mechanical tether. However, the wireless security functionality offered by the present design allows elimination of any tether at all, if desired.

Because the puck carries its own electronics board, it is possible to create signals that are uniquely identifiable to specific post positions, regardless of whether or not the unique signal is a security signal or some other type of informational signal that is useful to the retailer.

For example, when the post contacts are broken as the puck is lifted, it is possible to use that event to trigger different kinds of display functionalities. In essence, the puck may wirelessly transmit a signal that identifies a lift condition at that specific post position. That signal is uniquely identifiable and can be used for media displays.

It is common to run media content at displays—which can be a combination of running visual media displayed on a screen and/or audio media. The uniquely identifiable triggering signal from a post position can be used to trigger visual or audio media specifically tailored to the branded product at the post position. That is, the retailer may identify that a particular camera brand is mounted at post "A," for example. When that post is triggered by a lift signal, the control electronics may cause an advertisement specific to the brand or hand-held model that is played while the consumer is examining it. Likewise, when the product is returned, and a different one is lifted, a new, uniquely identifiably signal is wirelessly transmitted for causing different media content to be displayed. This arrangement makes for a useful set of sales features that universally combine sales, security functions, and ease of swapping older hand-held models with new ones as technology changes or new models are developed.

Using wireless signals to identify activity at different post positions opens up additional functions that may be useful to the retailer. For example, the retailer can track the number of "lifts" at each post during a given period of time. Information of this kind reveals which brands are the most popular or whether certain physical locations on the display are better than others, regardless of brand or price.

It would be possible for the retailer to develop a single post plan or "planogram" that universally applies to every display in every store, thus obviating the need to individually program media content at each store. Having the ability to transmit a unique signal that identifies marketing activity at specific post positions enables translation of that signal into a corresponding media event.

As indicated above, prior art displays have relied on multi-conductor cables that are included as part of a reel assembly for providing both electrical power and electrical security signals to the mounting or puck. In other words, the retractor carries one pair of wires for a power circuit that is connected to the power jack of the hand-held and a separate pair of wires for a security circuit that drives security sensors in the puck, or a secondary security cable, or both things at the same time. The advantage of the present invention is that only one power source or circuit from below the countertop is needed in order to drive both the power and security functions emanating from the puck position. Moreover, because power can be supplied when the puck is at "rest," and there is no need for under-the-counter power supply in "lift" mode, the need to use multi-conductor retractors is eliminated. Instead, mechanical retractors with steel cables can be used.

The foregoing summary will become better understood upon review of the attached drawings which are to be taken in conjunction with the written description set forth below.

BRIEF DESCRIPTION OF THE DRAWINGS

In the drawings, like reference numerals and letters refer to like parts throughout the various views, and wherein.

DETAILED DESCRIPTION

Figure 1:
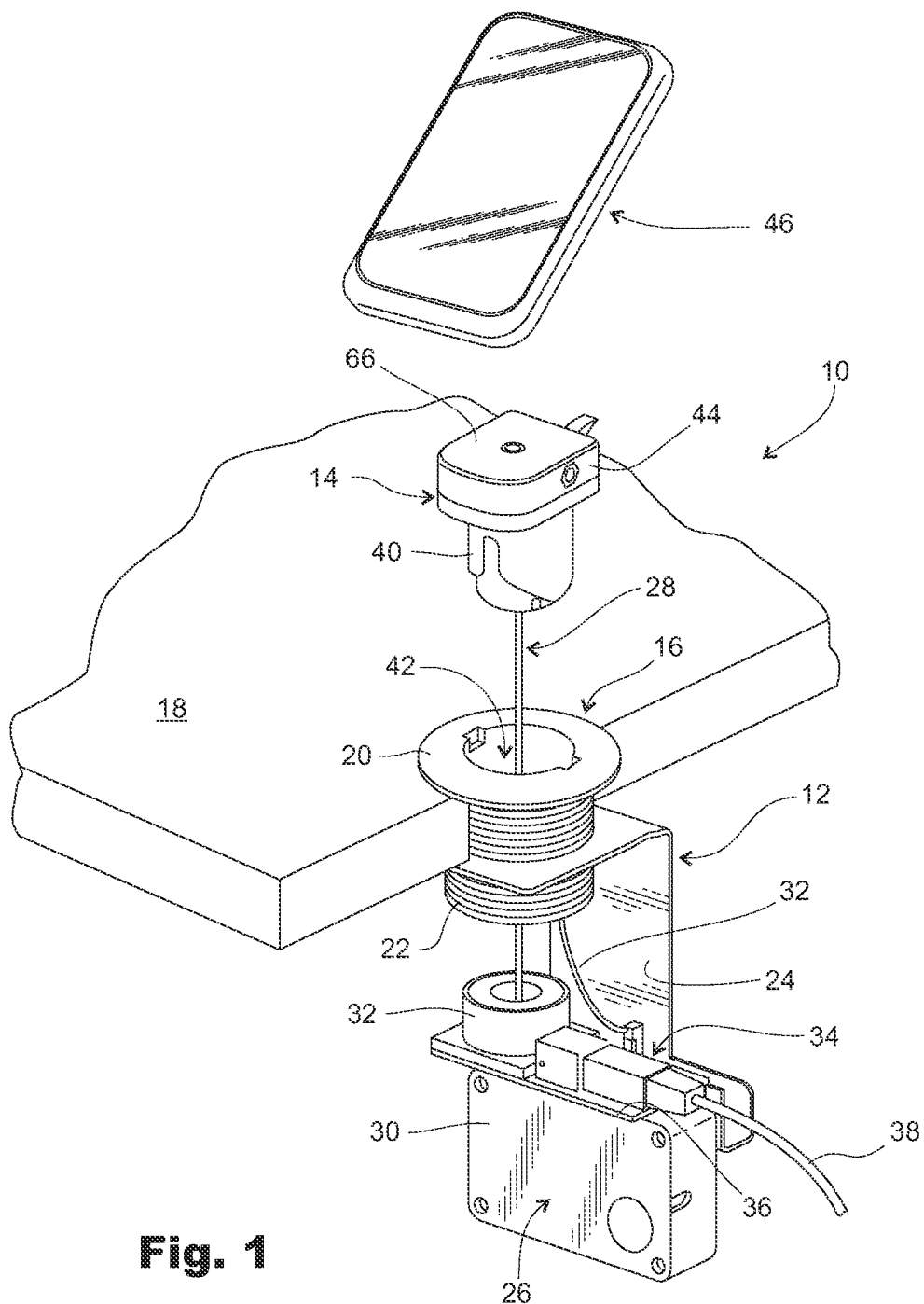
FIG. 1 is a pictorial view of a "post" position for mounting an electronic hand-held device to a retail display, with the Fig. showing the device exploded from the post.

In the drawings, and referring first to FIG. 1, shown generally at 10 is an improved display post assembly constructed in accordance with the various design improvements described and claimed here. The post assembly 10 includes a base assembly portion (indicated generally at 12) and a puck assembly portion (indicated generally at 14).

First, beginning with base assembly 12, the display post 10 includes a base assembly portion or fitting 16 that is mounted to a display countertop surface 18. The base portion 16 has an annular flange 20 that rests on top of surface 18. Extending downwardly from the annular flange 20 is a threaded portion 22 that carries a bracket 24. The bracket 24 further carries a mechanical retractor (indicated generally at 26).

The mechanical retractor 26 is conventional in design and includes a spring-loaded steel cable (indicated generally at 28), the length of which is drawn from and returned to the retractor housing 30 as the puck assembly 14 is lifted from and returned to the base assembly 12. The general construction of the mechanical retractor 26 (with steel cable) would be familiar to a person skilled in the art. However, a toroid 32 is mounted to an upper part of the retractor's housing 30. The toroid 32 surrounds the steel cable 28. Its function is further described later.

There are other electrical components (indicated generally at 34) mounted to a circuit board assembly 36 on the reel housing 30. These components electrically connect the puck assembly 14 to an under-the-countertop source module (described later) via cable 38, when the puck assembly 14 is resting on base 16.

Turning now to the puck assembly 14, it includes a lower portion 40 that nests within the space (indicated generally by arrow 42) in base part 20. The upper portion of the puck, indicated at 44, houses a puck electronics control board, or "ECB," which will be described later in the context of other application drawings. The puck assembly 14 carries a hand-held 46 which is mounted to the puck assembly 14 in conventional ways known to those who are familiar with countertop displays.

Figure 2:
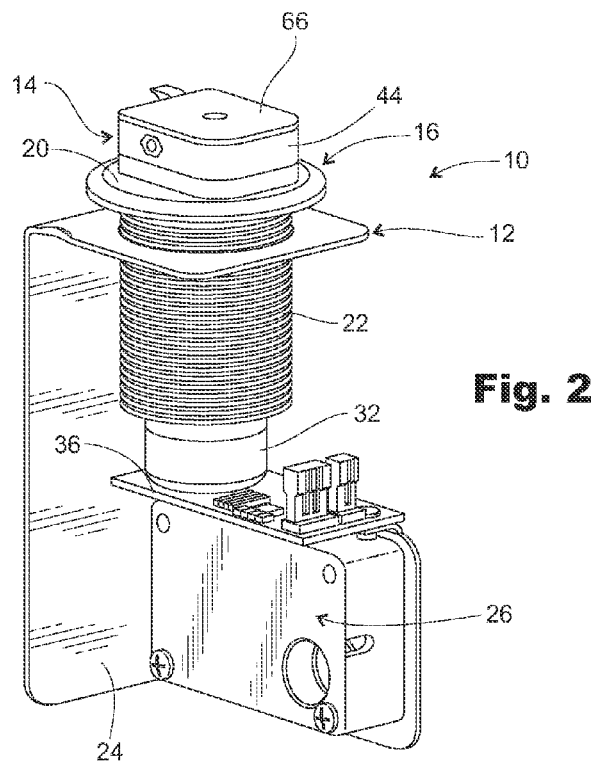
FIG. 2 is a pictorial view of the device shown in FIG. 1.
Figure 3:
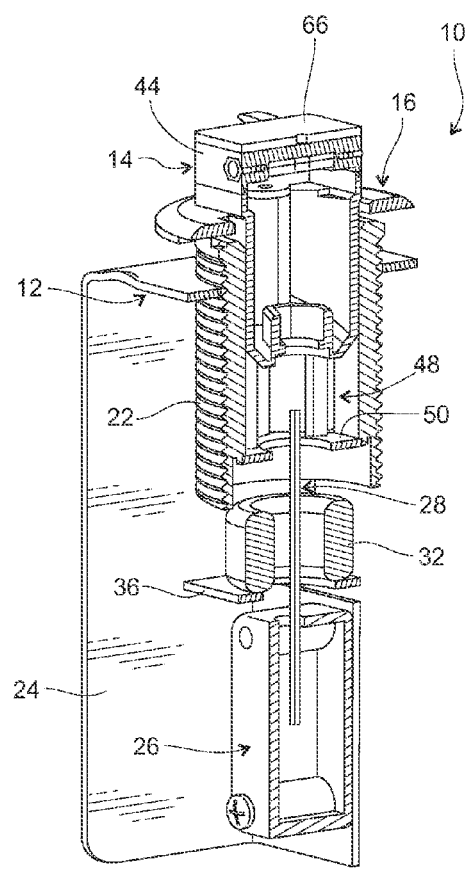
FIG. 3 is a sectional view of the device shown in FIG. 2.

FIG. 2 illustrates the post assembly 10 with a variation in the mounting bracket 24. FIG. 3 is similar to FIG. 2. However, FIG. 3 is sectioned axially along the length of the post assembly 10 and reveals the location of spring contacts (the location is generally indicated at 48) that provide the means for supplying power to the puck assembly 14. These contacts will now be described by referring to FIG. 7.

Figure 7:
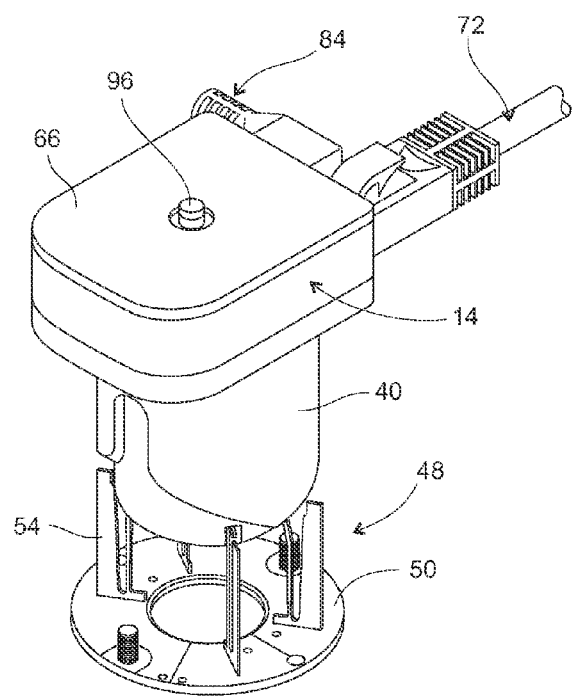
FIG. 7 is a view like FIGS. 5-6, but shows part of the base member portion removed.
Figure 8:
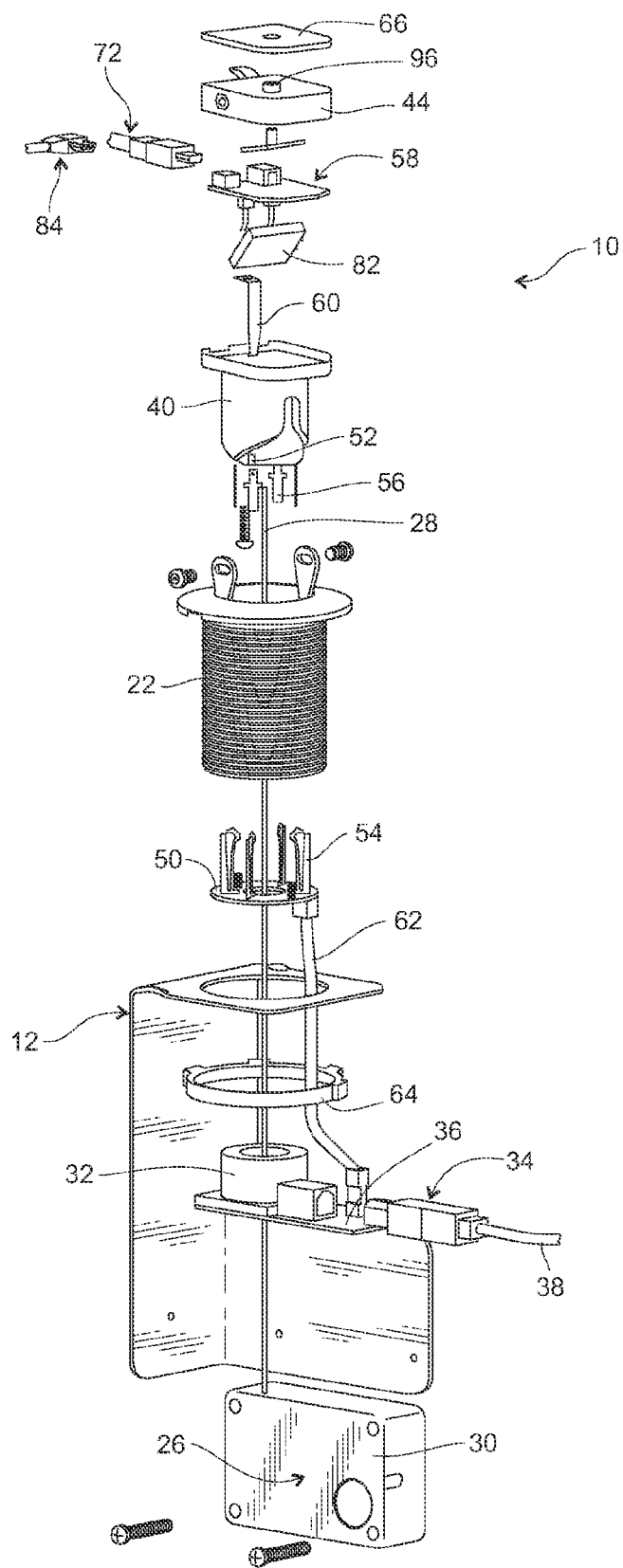
FIG. 8 is an exploded view of the post shown in FIG. 1.

Directing attention there, FIG. 7 illustrates an annular plate 50 (that is also shown in FIG. 3). The annular plate or part 50 rests within the lower portion of the base's threaded part 22. The lower portion 40 of the puck assembly 14 has slots 52 (see, e.g., FIG. 8). Preferably, these slots 52 are distributed around the circumference of part 40 and slide over a complementary set of spring contacts 54 that are resident on the annular part 50. There may be different variations on the way this is done. As is illustrated in FIGS. 7 and 8, the spring contacts 54 on the annular part 50 are "female." The lower portion or part 40 of puck assembly 14 carries "male" contacts 56 (see FIG. 8). These male contacts 56 engage with the female contacts 54 when the puck assembly 14 rests in the base part 20. At that time, an electrical connection is made between the puck 14 and base 16.

Turning now to FIG. 8, which is an exploded view, the male contacts 56 are connected to an electronics control board ("ECB") 58 via assembly 60. The ECB 58, which will be further described later, resides within puck part 44.

Another wire assembly 62 connects the female contacts 54 to the circuit board 36 that normally rests above the mechanical retractor 26. The second wire assembly is further connected to cable 38 which, as mentioned above, connects the post assembly 10 to a source module or other under-the-counter control electronics (described later). It should be mentioned at this point that the embodiment illustrated in FIG. 8 includes a clamping structure 64 or similar means that holds the base part 20 in place relative to bracket 24.

FIG. 8 also provides a good view of the ECB 58 and other component parts that reside within the puck assembly 14. One of the more important features of the design described here is that the puck continues to be in an active, operating state after the consumer lifts it from the base assembly 12.

As described above, when a "lift" event occurs, the electrical connection that is created by spring contacts 54 and 56 is broken. The only power line connection from under the counter to the puck occurs when the puck assembly or puck 14 is at rest (as shown in FIGS. 2, 3 and 5-6, for example). At this point in time, the wiring assembly that is defined by the serial connections consisting of cables 38, 62 and 60 provide one power wire circuit (single source power) from under the counter to the ECB 58. As a skilled person would understand, the post assembly 10 is operated on DC voltage. Therefore, the circuit needs to be defined by two wires within the cable just described, one to create a "ground." This one circuit is the sole wire-to-wire connection that arises between under-the-counter control electronics and the puck assembly 14 and it arises only when the puck is at "rest."

The design offers at the puck, or ECB 58 level, a sufficiently high voltage and amperage to operate any kind of hand-held that might be mounted to the top face surface 66 of the puck assembly 14. For example, the voltage offered at the puck level might be as high as 18 volts. Assuming the amperage is sufficient, this voltage is more than adequate to operate the various types of hand-helds sold on the market today, if the voltage is stepped-down from the puck assembly 14, which will be described later.

Figure 19:
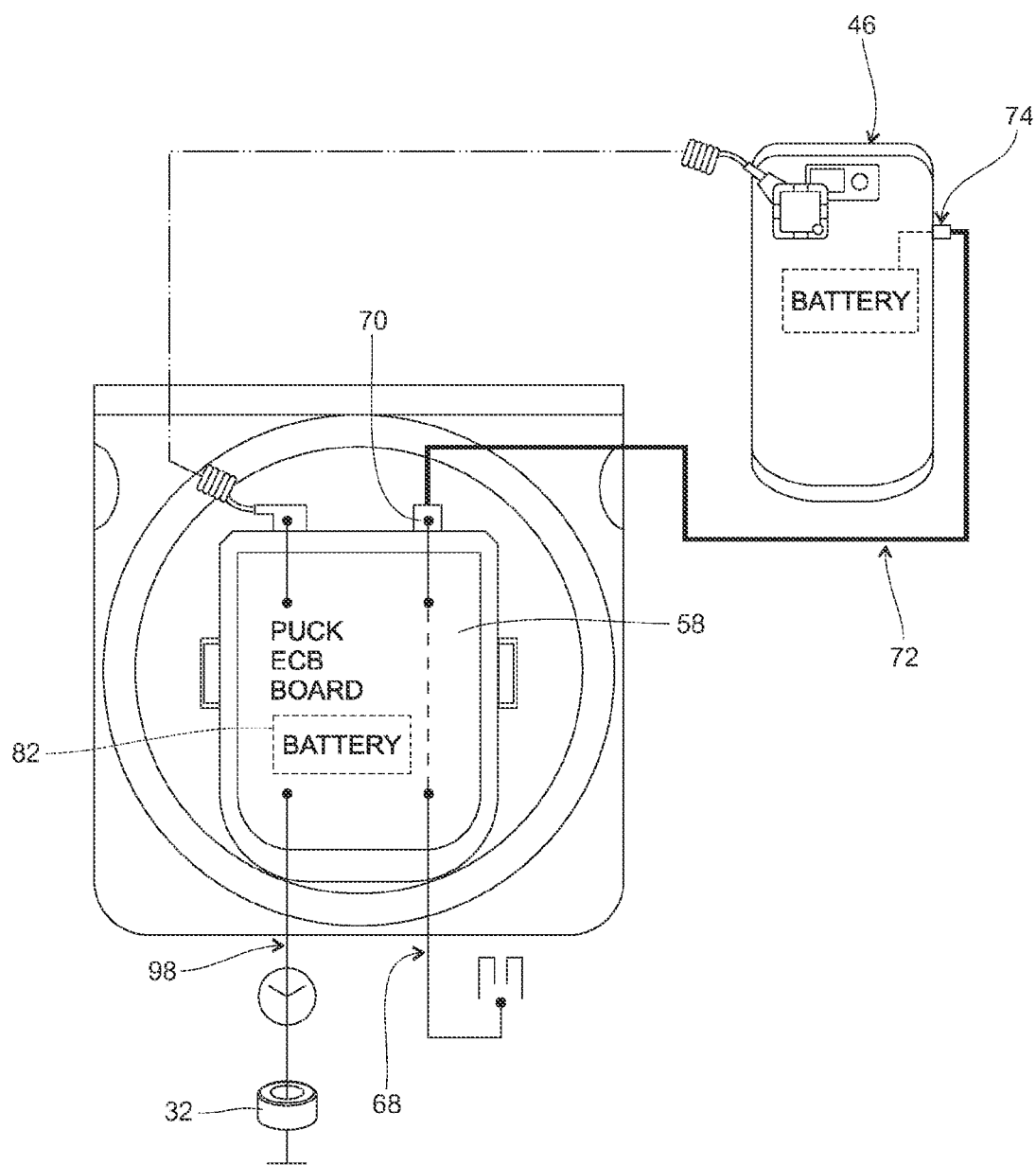
FIG. 19 is a top view of a post position and schematically illustrates the interconnections between a puck and electronic device.

Directing the reader's attention to FIG. 19, arrow 68 generally indicates the wire assembly described above that provides power to the ECB 58 when the puck is at rest. At that time, the ECB 58 has circuitry that passes the voltage through to a connector fitting 70 on one side of the puck 14. According to a preferred embodiment, a short adaptor cable, indicated generally at 72, interconnects the puck connector 70 and the power jack on the hand-held 46. The hand-held power jack is generally indicated at 74.

Figure 20:
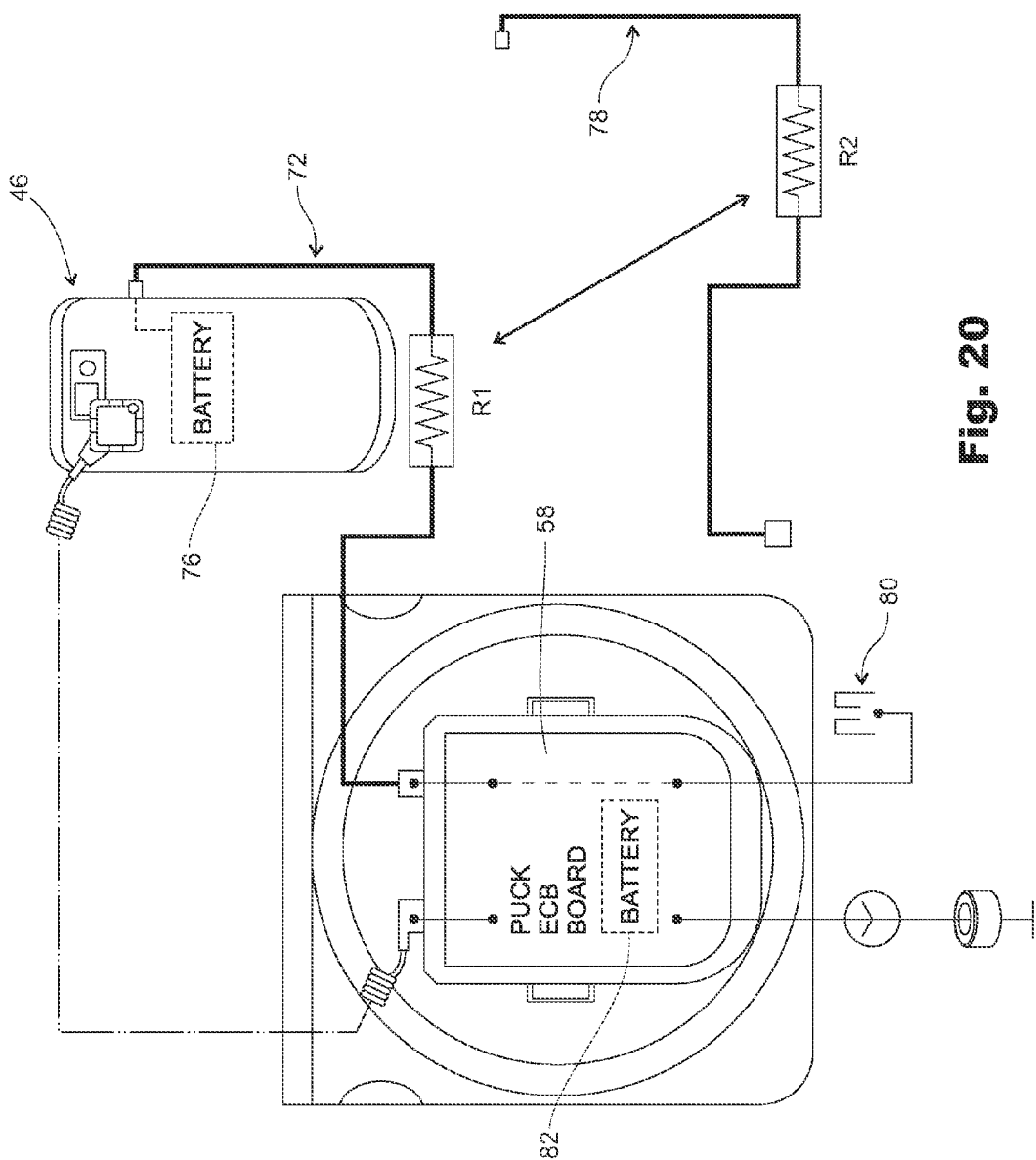
FIG. 20 is a view like FIG. 19, but illustrates how one device may be swapped with another off a post.

Referring now to FIG. 20, the adaptor cable 22 has a unique key circuit or resistor circuit (R1) that adjusts the voltage supplied by ECB 58 to the specific power requirements of the hand-held 46. As a person skilled in the art would know, a typical cell phone operates at a different voltage relative to a camcorder, as one example.

The adaptor cable 72 connects the ECB 58 to the hand-held's internal battery 76. This, of course, charges battery 76. When the puck assembly 46 is in "lift" mode, the hand-held's battery 76 allows the consumer to operate the hand-held on the puck, so that the consumer can visually inspect the hand-held's display, how its buttons work, etc.

As indicated previously in this disclosure, one of the overall advantages of the post assembly described here is that it provides an easy way for a salesperson to swap different hand-held devices 46 to and from the post assembly position. This is schematically indicated in FIG. 20 by the second adaptor cable 78. The second adaptor cable 78 will have a different resistance value (R2) that steps down the voltage from ECB 58 to a uniquely different level. Thus, the retailer or retailer's salesperson simply selects the appropriate adaptor cable that corresponds to the model or brand of hand-held and swaps one with the other by simply removing and replacing the hand-held from the puck's upper surface 46.

Figure 14A:
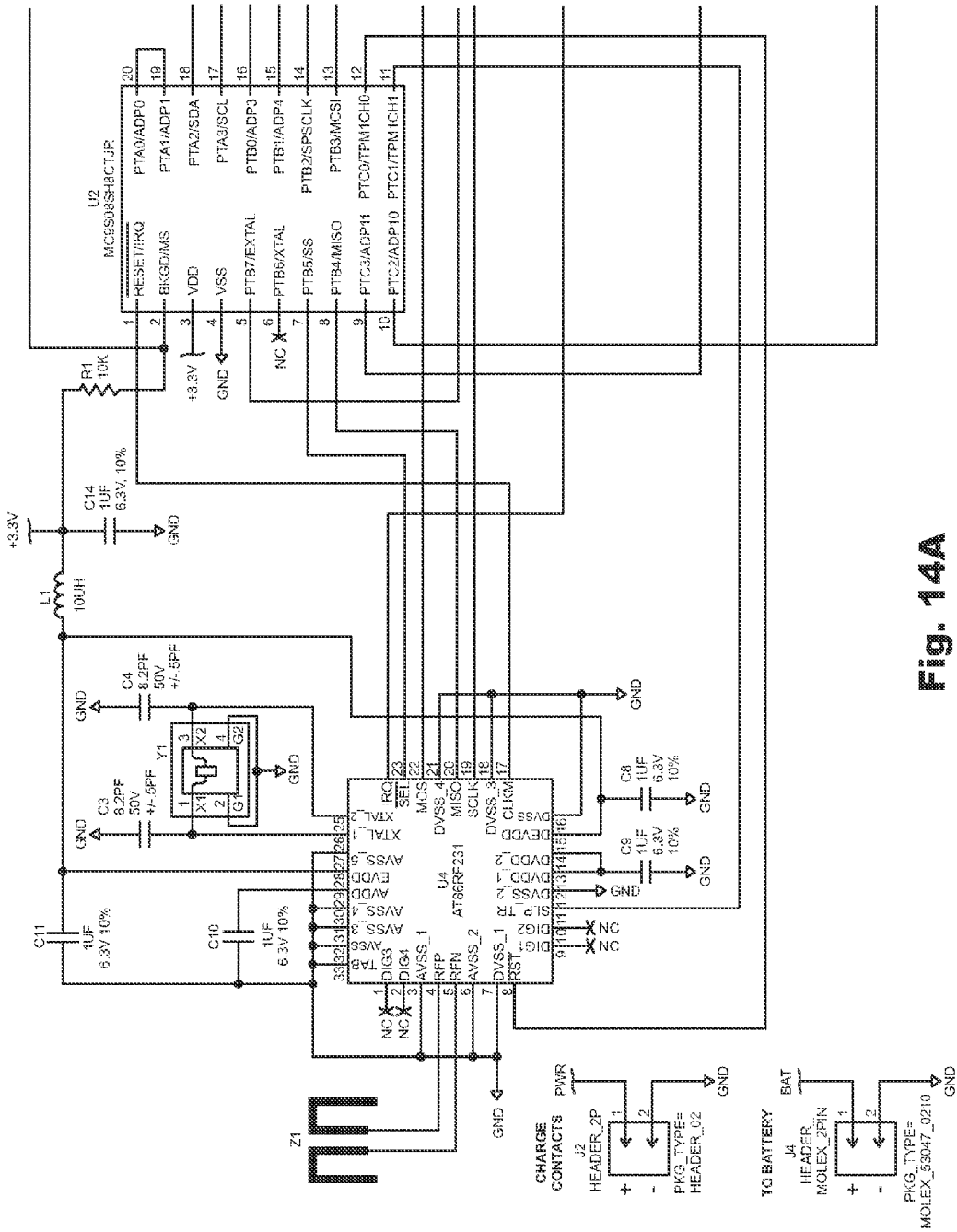
FIG. 14A is the first in a series of two electronic schematics illustrating the electronics in the puck portion of the invention.
Figure 14B:
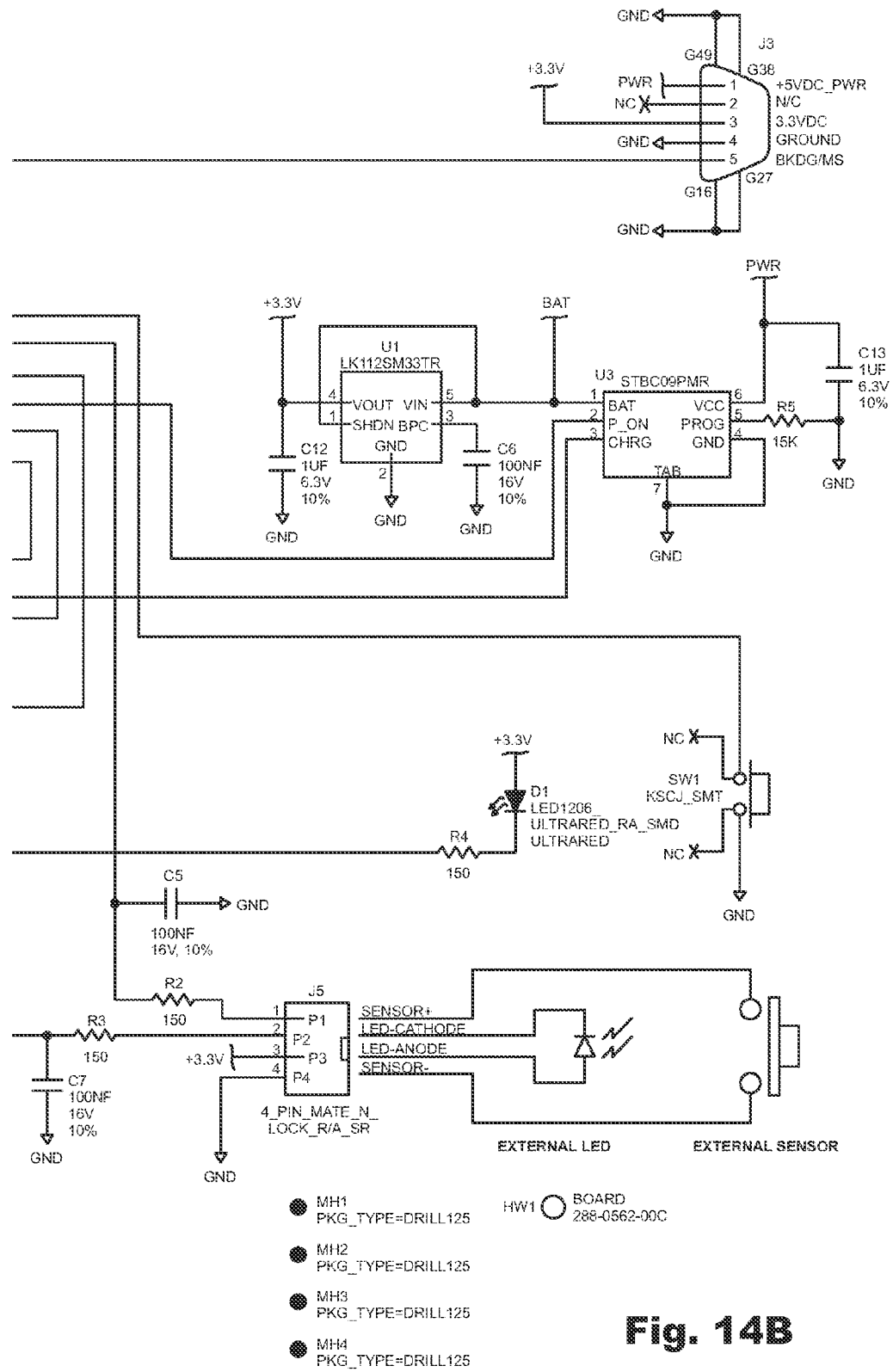
FIG. 14B is the follow-on schematic from FIG. 14A.
Figure 15:
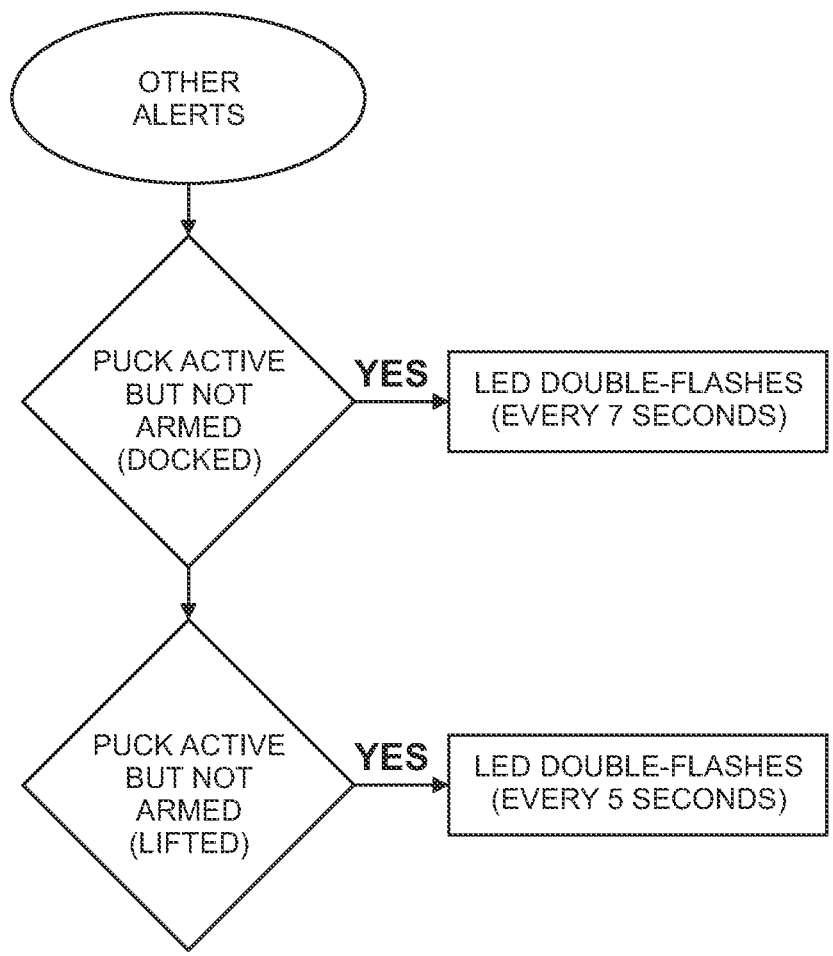
FIG. 15 is a flow chart illustrating selected alert conditions for the display.
Figure 16:
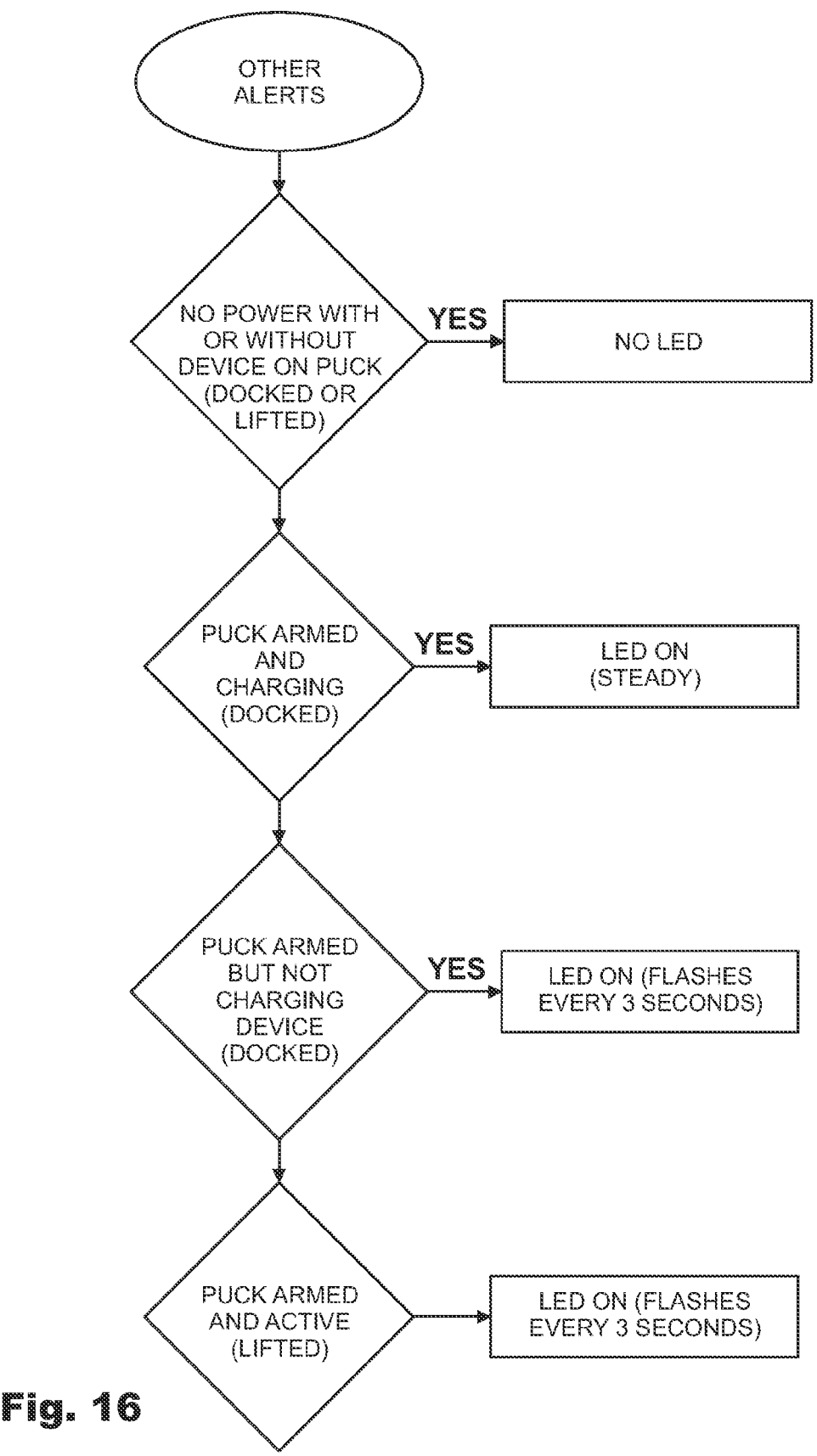
FIG. 16 is a flow chart like FIG. 15.
Figure 17:
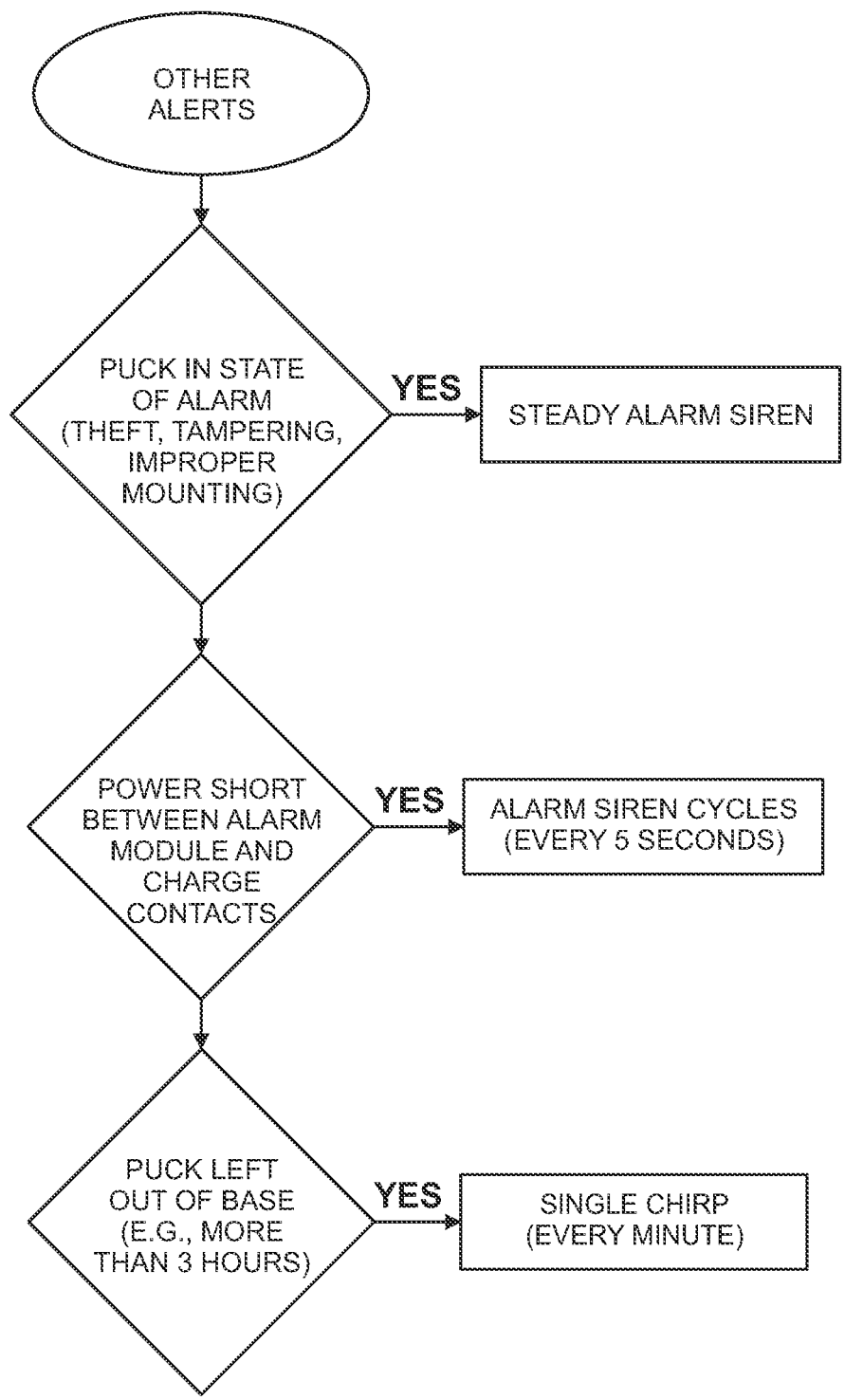
FIG. 17 is a flow chart like FIGS. 15-16.
Figure 18:
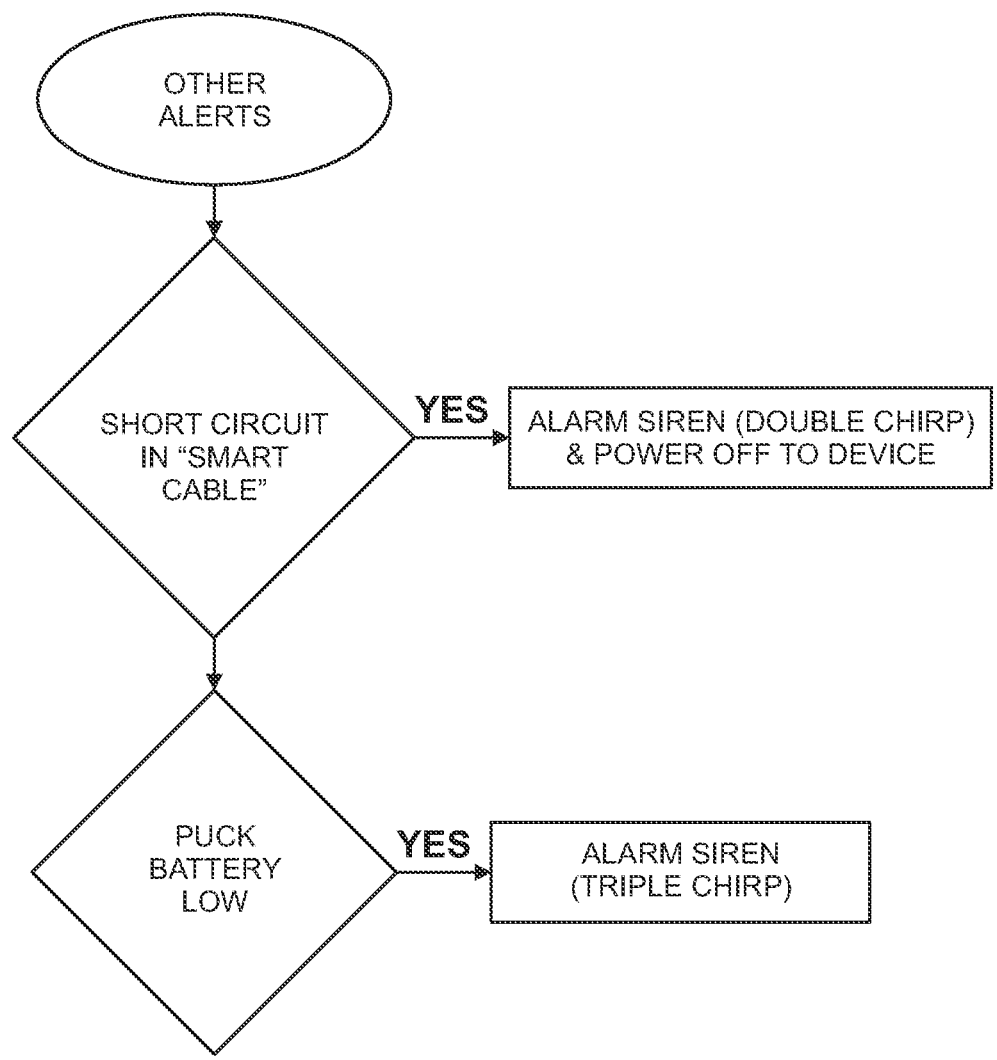
FIG. 18 is a flow chart like FIGS. 15-17.

In FIG. 20, arrow 80 generally represents an under-the-counter source module 80 (described further below). Power from the source module 80 is distributed by the ECB 58 which passes one portion to the hand-held 46 and another portion to ECB circuitry (see FIGS. 14A-B) and a battery 82. The battery 82 is also illustrated in FIG. 8. Its size will be a variable depending on application or the physical footprint of the puck assembly 14.

Figure 4:
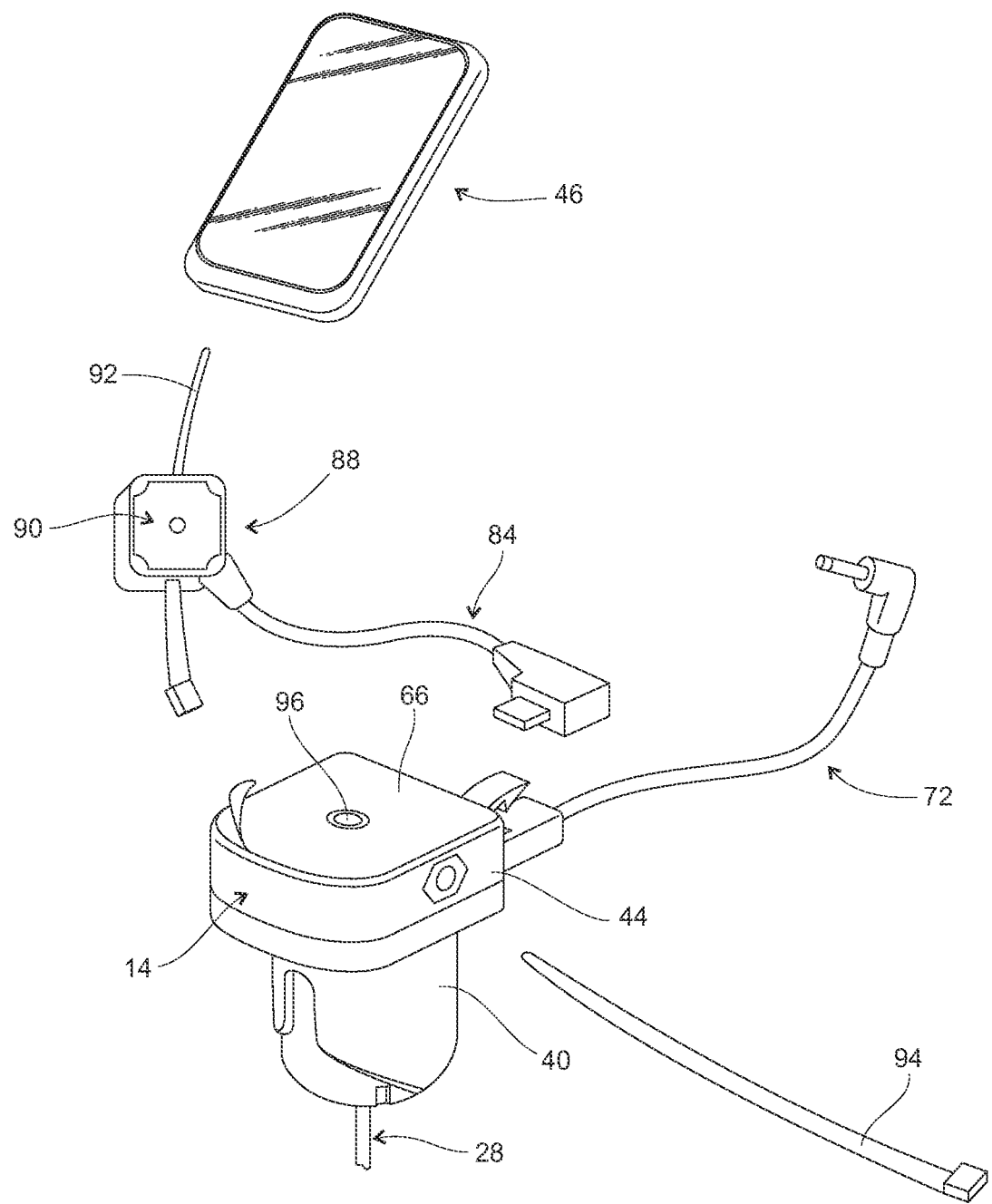
FIG. 4 is an exploded view of the mounting member or "puck" portion of the post position illustrated in FIGS. 1-3.
Figure 5:
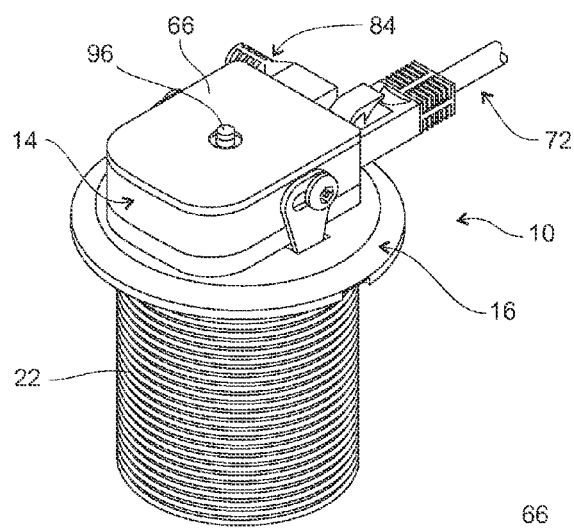
FIG. 5 is a view of the puck and base member portions of the post illustrated in FIGS. 1-3.

The puck battery 82 is also charged by ECB circuitry when the puck assembly 14 is at rest. When lifted, the puck battery 82 then serves to drive ECB electronics, which will include one or more security sensors. Referring to FIG. 4, for example, it is common to use secondary security sensors like the one illustrated generally at 84. A security sensor of this type will connect to the ECB 58 via fitting 86 (see, for example, FIG. 6). As shown in FIG. 4, an outer end 88 of the secondary cable 84 may include a pressure-type sensor with a pressure pad or pressure button that rests against one side of the hand-held 46. The pressure pad portion is generally indicated at 90 in FIG. 4. The pressure pad 90 may be held in place by a cable strap 92 that surrounds the hand-held 46. Similarly, the hand-held 46 may be held in position against the top surface 66 of the puck assembly 14 via another cable strap 94.

Figure 6:
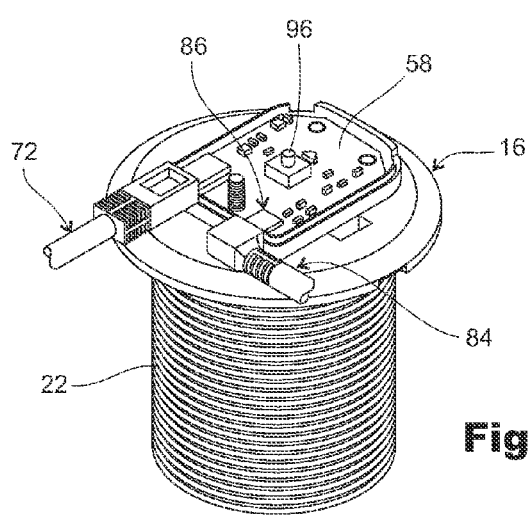
FIG. 6 is a view similar to FIG. 5, but shows the base portion of the "post" position with the puck in partial section.

It is also common to use another security sensor at the interface between the hand-held 46 and puck top surface 66. FIG. 4 illustrates a pressure button 96 that is depressed when the hand-held 46 is mounted to the puck assembly 14. Another illustration of the pressure button 96 is shown in FIG. 6 where the ECB 58 is revealed as well.

The pressure button 96 is released when the hand-held 46 is removed. Disconnection of the secondary sensor cable 84 or release of the pressure button 96 will trigger a security signal that is transmitted in the manner described below.

Referring again to FIG. 19, arrow 98 generally indicates a line that corresponds to the cable 28 carried by the mechanical retractor 26. As described above, and continuing to refer to FIG. 19, the retractor cable 98 is preferably a braided steel cable for mechanical security purposes. While not adequate or suited for functioning as a typical conductor (e.g., for transmitting power or security signals), the cable 98 (see FIG. 19) is nevertheless capable of functioning as an antenna. Therefore, the ECB electronics (see FIGS. 14A-B) are designed to apply an electromagnetic signal to cable 98. In this manner, the cable 98 therefore serves as a transmitting antenna with fluctuations in the electromagnetic signal serving as a means to communicate various kinds of information.

One kind of obvious information to be communicated by ECB 58 relates to a security breach condition that could be triggered by the secondary security cable 84 or pressure button 96 described above. In other words, if a user should attempt and be successful at removing the hand-held 46 from the puck assembly 14, the depressed pressure button 96 will be released thus triggering a signal that is picked up by the ECB board. This, in turn, will cause a change in what is transmitted via the antenna that is created by the mechanical retractor's cable 98.

It is to be appreciated that the wireless functionality described above could be handled in other ways such as, for example, building a small antenna on the puck ECB board 58. However, many of the past problems relating to display technologies of the type described here involves ongoing reliability problems. Post assemblies need to operate for long periods of time without maintenance. Maintenance is a problem for a retailer because these systems are becoming highly sophisticated and the retailer lacks the capability or means to fix serious technical problems when they arise. Therefore, it is believed that creating antenna structure in the form of a mechanical steel retractor cable is a highly reliable way to generate electronic signals over a long period of time without malfunctions. As indicated above, signals transmitted by the cable/antenna 98 are picked up by the toroid 32 that is resident on the mechanical retractor 26 (see FIGS. 19 and 1, for example).

Figure 9:
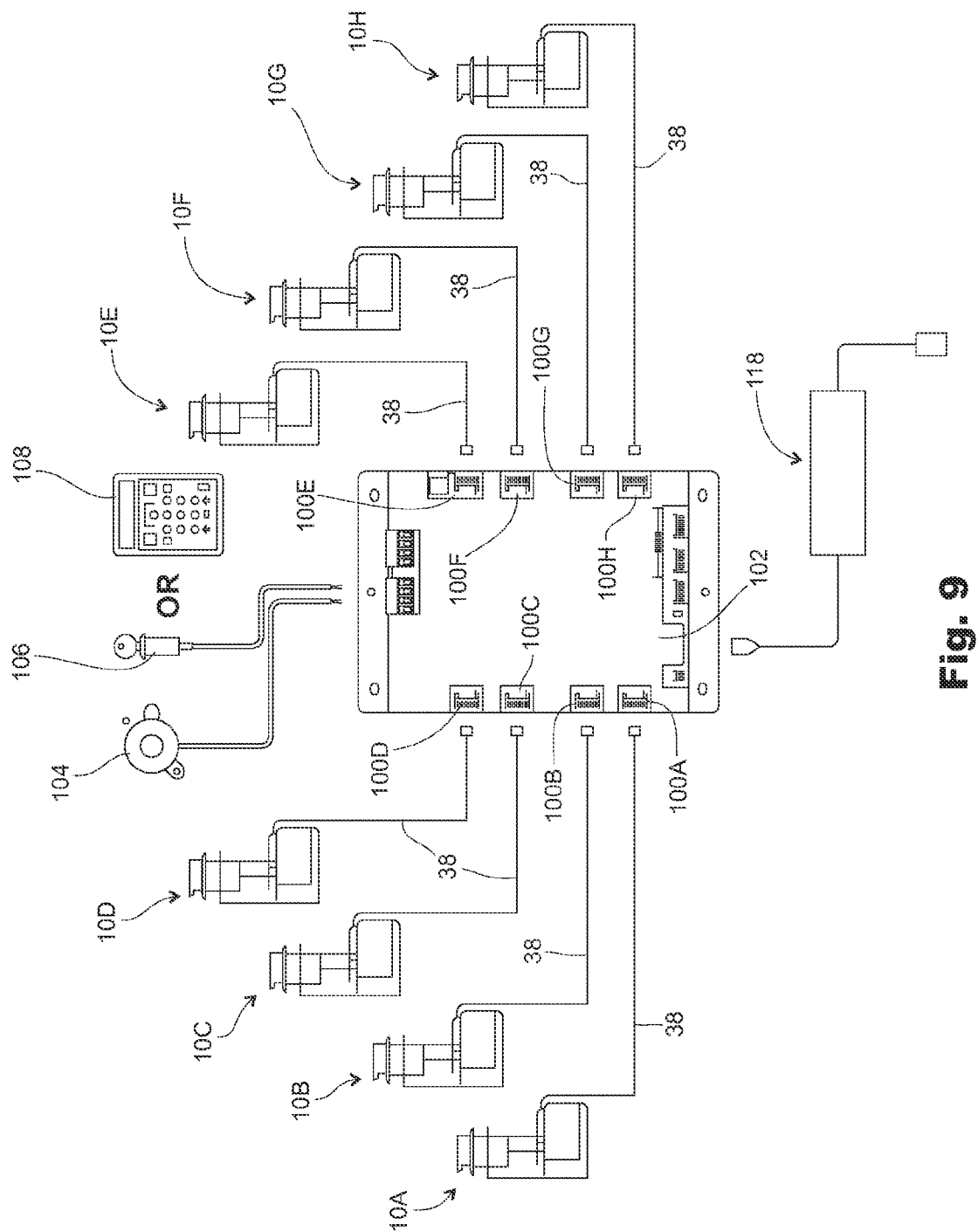
FIG. 9 is a schematic view of a display constructed in accordance with the invention, and schematically illustrates a plurality of post positions connected to a supply module.

Directing the reader's attention now to FIG. 9, illustrated therein is a schematic arrangement that reflects a typical display installation at a retail site. The post assembly 10 previously described is illustrated in FIG. 9 with additional letter designations (10A, 10B, etc.) to reflect the different numbers of posts used in a typical display. To the extent this description refers to post "A", for example, post "A" is meant to refer to post assembly 10A in FIG. 9, and so forth.

In the previous description relating to FIGS. 1 and 8, cable 38 was described as part of an overall wiring assembly that connected each post assembly 10 to a source or control module that is normally located under the countertop of the display. In FIG. 9, reference numeral 38 schematically indicates the cable just described, for each post assembly 10A-10H. Each cable is connected to a conventional low voltage connector 100A-H on a control module 102.

Figure 21:
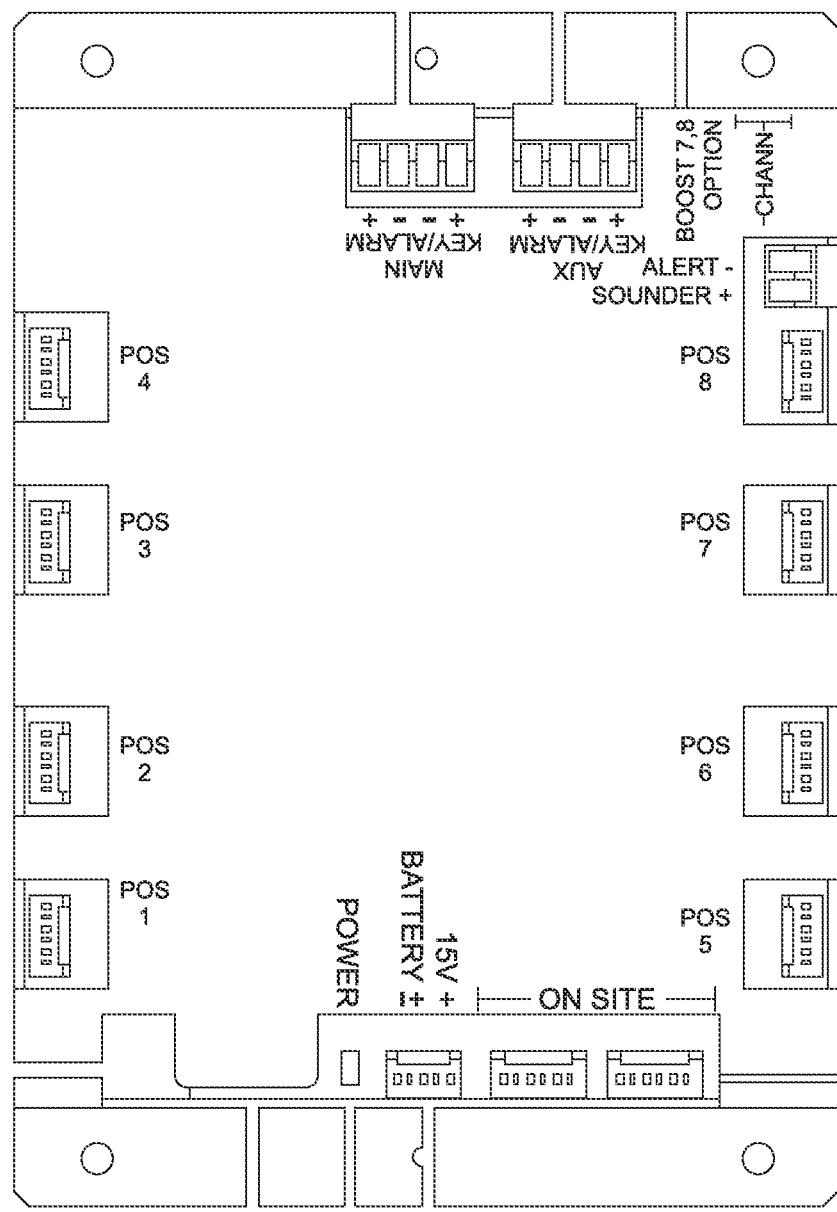
FIG. 21 is a view of a source/alarm module.

An enlarged view of the control module 102 is illustrated in FIG. 21. The control module 102 may have terminal blocks 104, 106. A key pad, as schematically indicated at 108 in FIG. 9, makes it possible to set up remote control alarm activation, if desired.

Figure 10:
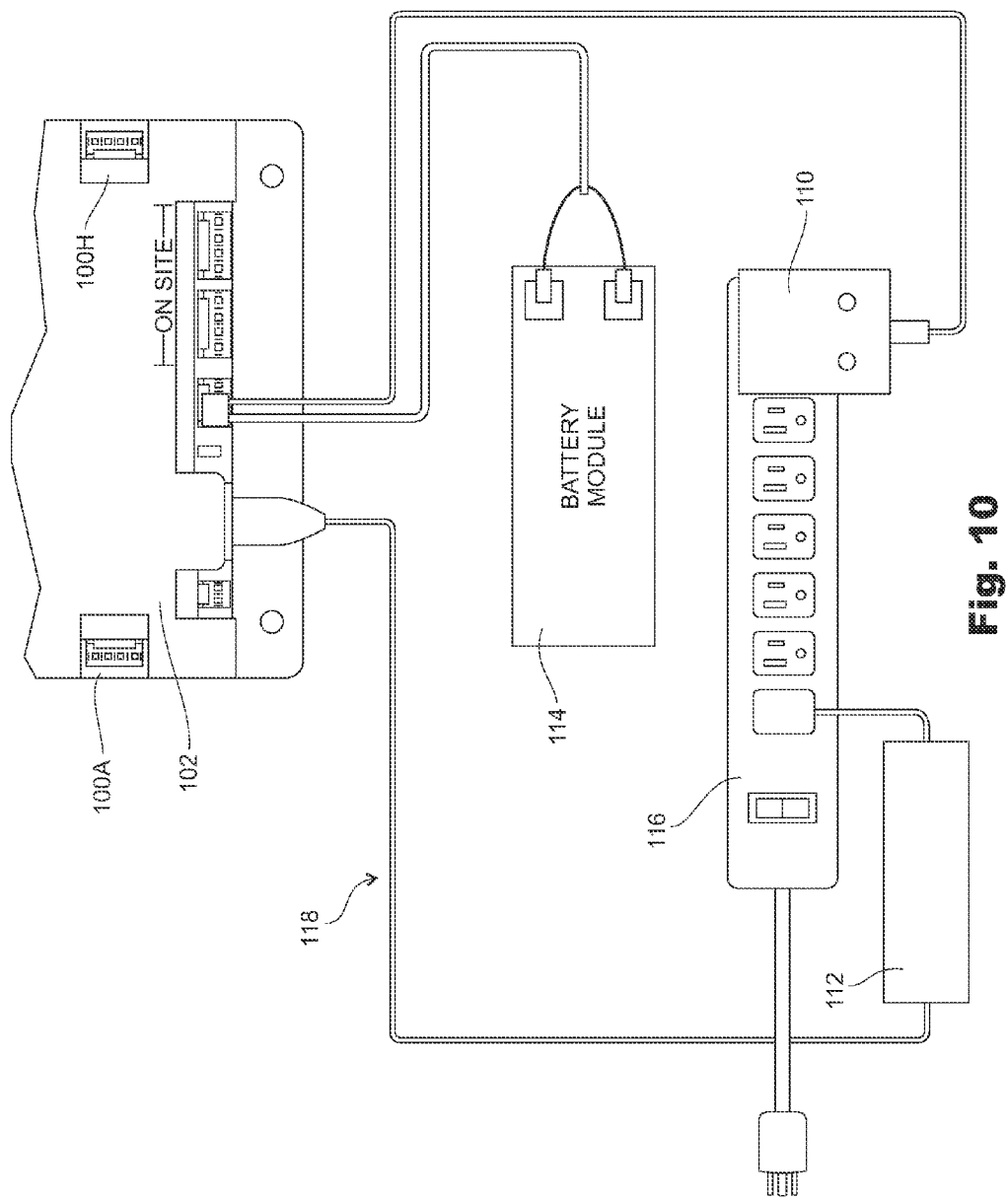
FIG. 10 is a view like FIG. 9, but illustrates power supply features of the invention.
Figure 11:
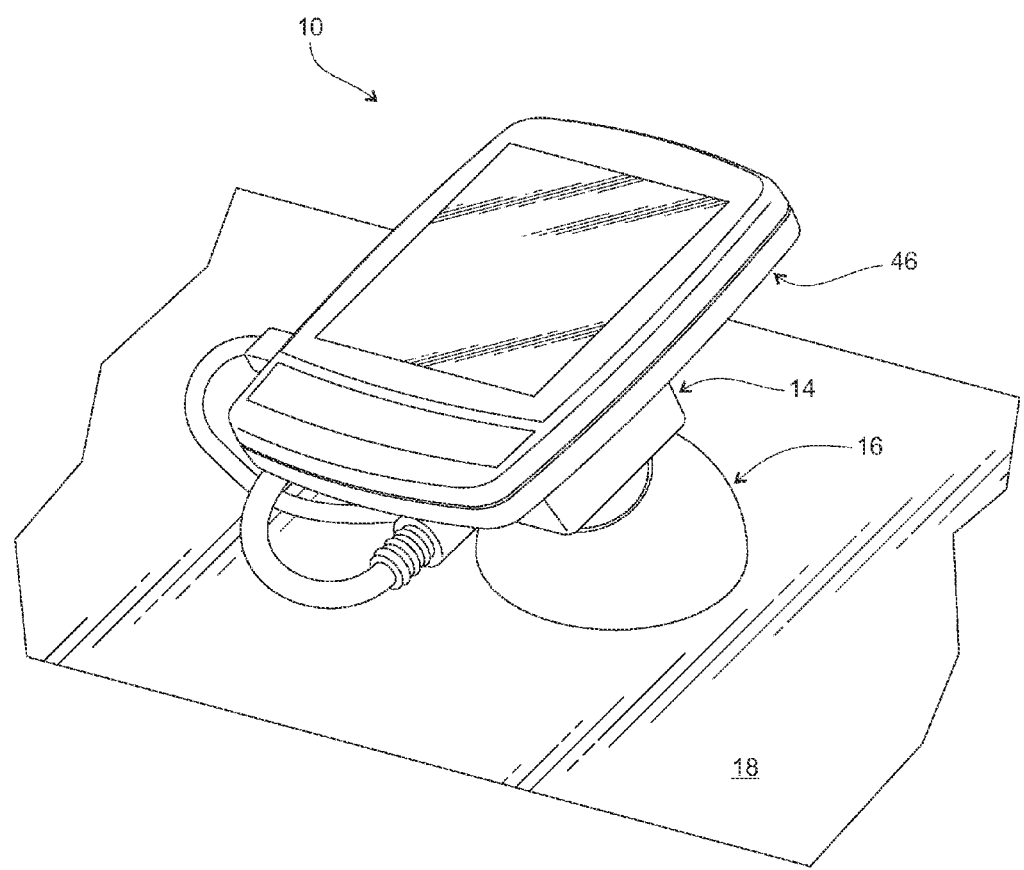
FIG. 11 is a pictorial view of the top part of a post.

Turning now to FIG. 10, the control module is powered by conventional means, and preferably, operates as a low voltage system that has different power adaptors (e.g., power supply for battery backup) 110, 112 for the purpose of driving different functionalities coming off of the control module 102. Obviously, the single-source power line to each post assembly 10, as described above, emanates from the control module 102. However, as will be further described later, the control module 102 may also serve as a distributor for other signal functions (i.e., triggering the display of media content), depending on which pucks 14 are lifted from a respective post position. The control module 102 may have its own battery backup 114 in case of power failure. Otherwise, the entire control system may be driven from a conventional power strip 116, which would be familiar to a person skilled in the art. It should be mentioned, at this point in time, that arrow 118 in FIG. 9 generally refers to the power supply features described above relative to FIG. 9.

Figure 22:
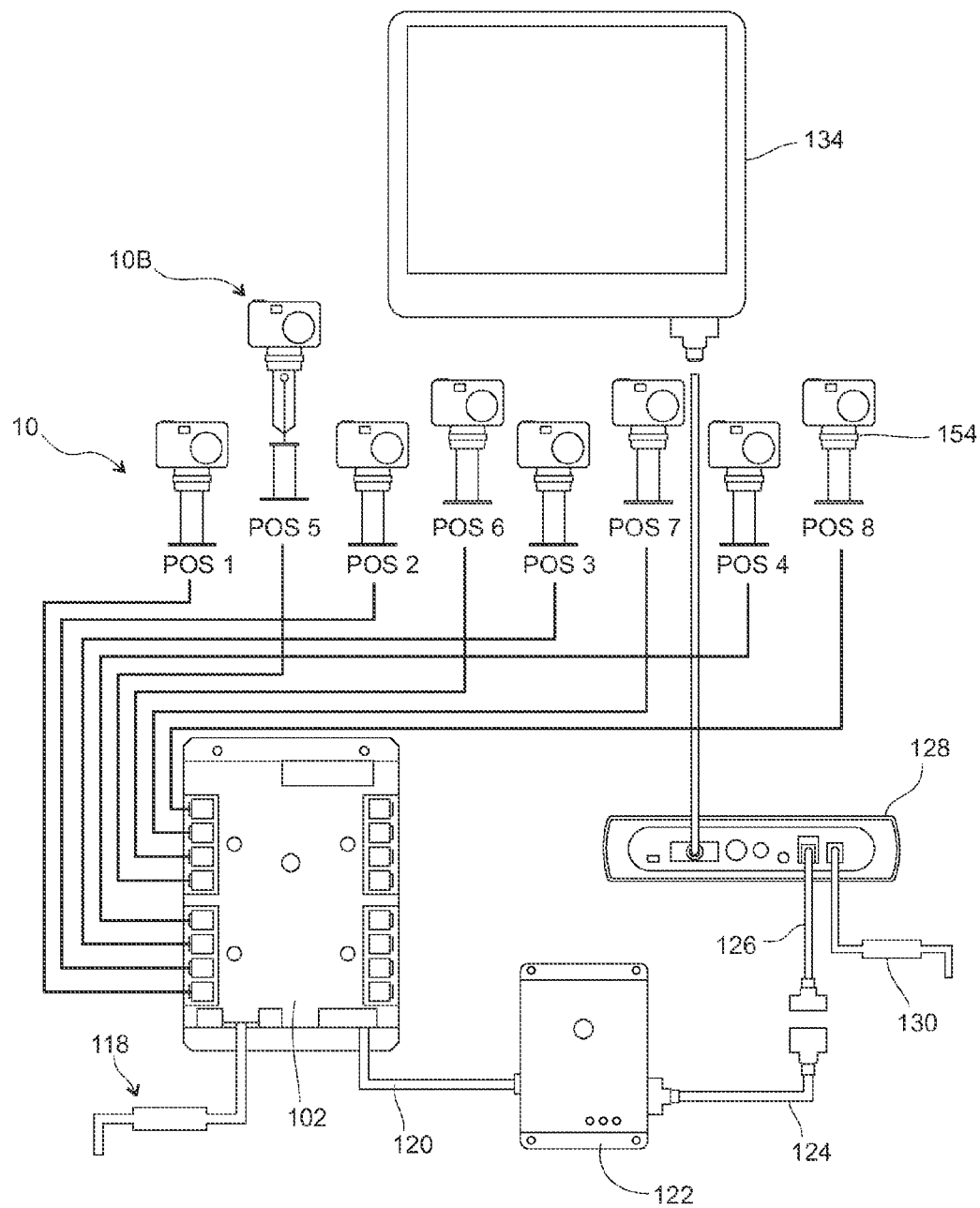
FIG. 22 is a view similar to FIG. 9 and illustrates a display system having a plurality of post positions along with a display monitor that shows media content depending on which electronic device is examined by a consumer.

Referring now to FIG. 22, for example, the control module 102 (labeled as "alarm" module, which is one way of referring to "control" module) is connected to another control module ("UIM") 122 via a logic cable 120. Another wiring assembly for cable assembly 124, 126 interconnects the UIM module 122 to a media player 128 or the like. The media player 128 will typically have its own power supply 130.

Post assembly position 10B in FIG. 22 represents a typical puck "lift" condition. When this happens, the post assembly's spring contacts 54, 56 are broken. The ECB board 58 in the puck detects breaking of the contacts 54, 56 and generates an appropriate signal to the controller 102 that indicates "lift." While this may be done in different ways, preferably, the signal is communicated via cable/antenna 98 to toroid 32 (see FIG. 19) that is resident on the mechanical retractor (see FIGS. 1 and 8, for example).

Redirecting attention briefly to FIG. 8, for example, the toroid 32 resides on a circuit board 36 on top of the mechanical retractor 26. Cable 38 is a multi-conductor cable that interconnects circuit board 36 to the controller 102. Thus, both security signals (via toroid 32, for example) and power signals are communicated between the mechanical retractor position 26 and controller 102 via a "multi-conductor" cable. However, and referring to FIG. 1, power is supplied via a single source or single line, which is indicated generally by reference numeral 62. In other words, arrow 132 indicates a power wire from circuit board 36 to the spring contacts 54, 56 within the puck assembly 10 as previously described.

Referring back to the media player 128, when the puck at post position 10B is lifted, the controller 102 detects the lift signal and communicates it to the media player. The UIM module 122, in essence, translates the signal and instructs the media player 128 to play content that has been uniquely mapped to post position 10B.

For example, if post position 10B carries a particular make, model or brand of a camera, the media player 128 is instructed to play pre-stored content for that particular device. The media content may be visually displayed via a conventional monitor 134 or it may be combined with audio content that is broadcast from local speakers (not shown) that explains unique features about the device.

It is to be appreciated at this point, that the post assembly 10 described herein, when implemented in an overall system of the kind illustrated in FIG. 22, provides a truly universal system for a retailer. When the system is installed, the permanent components consist of the under-the-counter control modules, media content player (or players) and the hardware configurations of the posts. What is left for the retailer to do is swap models to and from post positions or add or subtract media content that is correlated to individual post positions.

Figure 23:
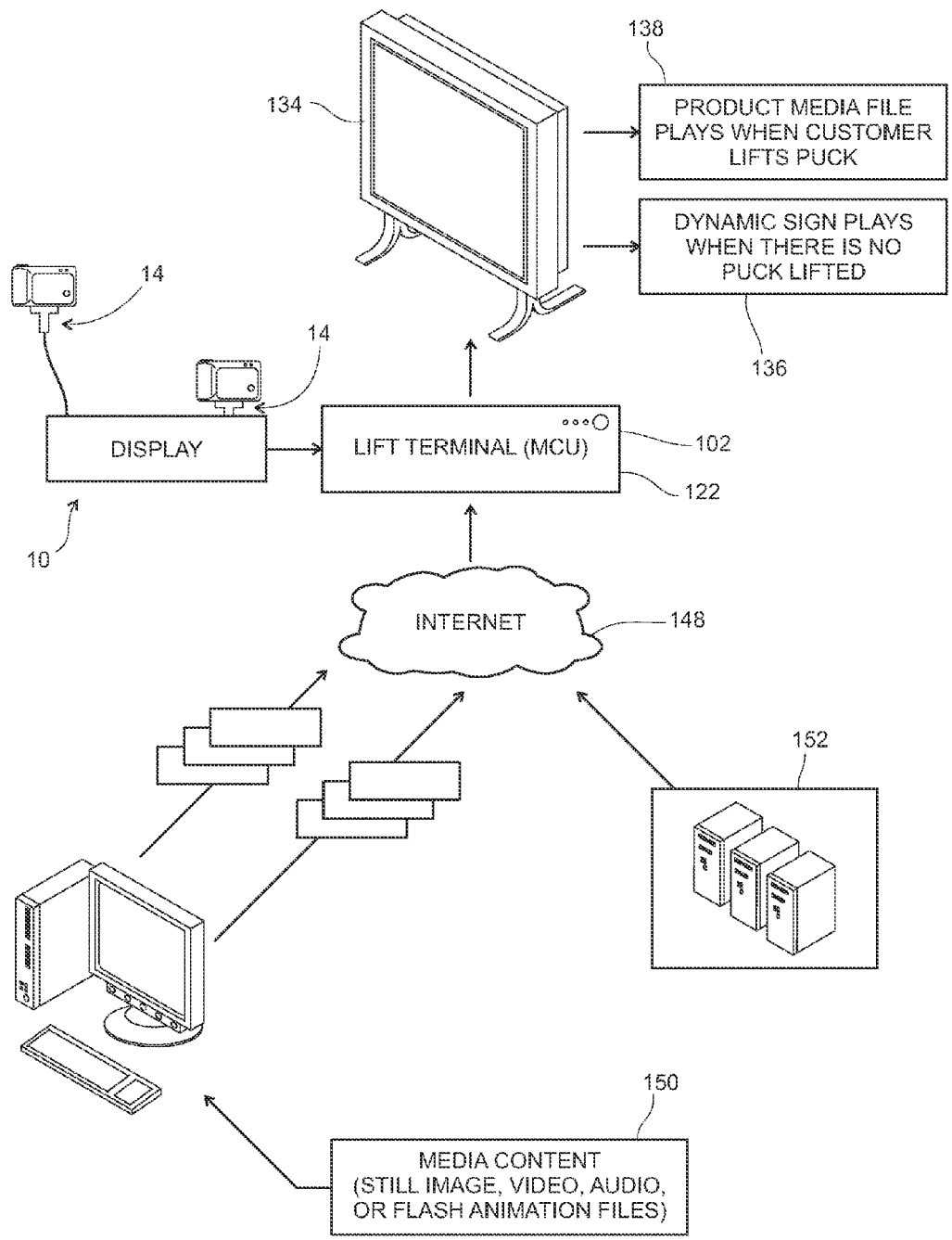
FIG. 23 is a schematic that illustrates display functionalities of the invention.

FIG. 23 illustrates another variation of the system described above. It is possible to program media content at the display level in different ways. In preferred form, for any display having a monitor 134, there will always be something playing on the monitor (arrow 136) even when no pucks are lifted at any post or "SKU" position. According to the system described above, when a "lift" is detected at any particular post position, then a media file specific to that position can be played, as indicated at 138.

Figure 24:
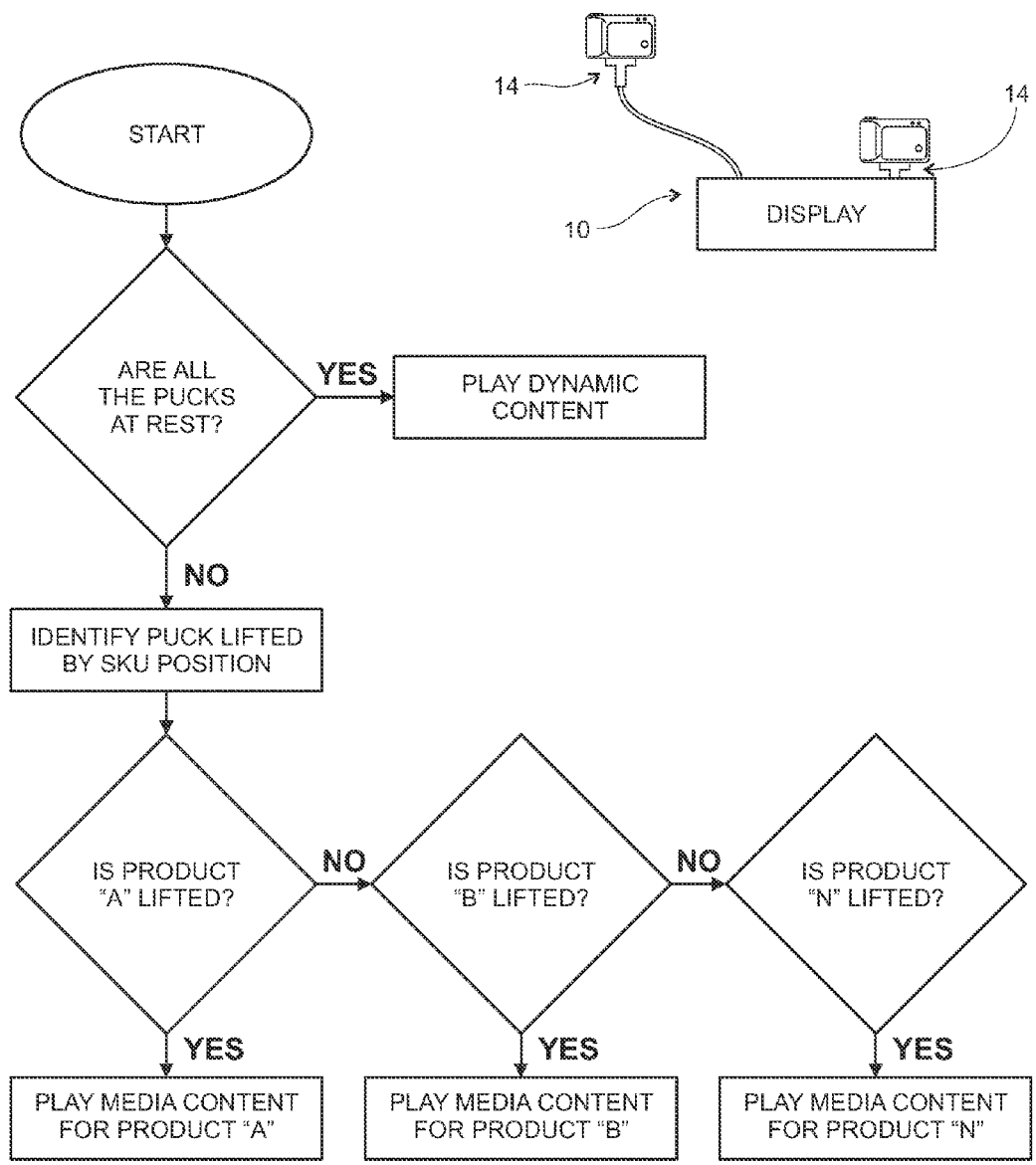
FIG. 24 is a flow chart that illustrates the logic underlying display functionality.
Figure 25:
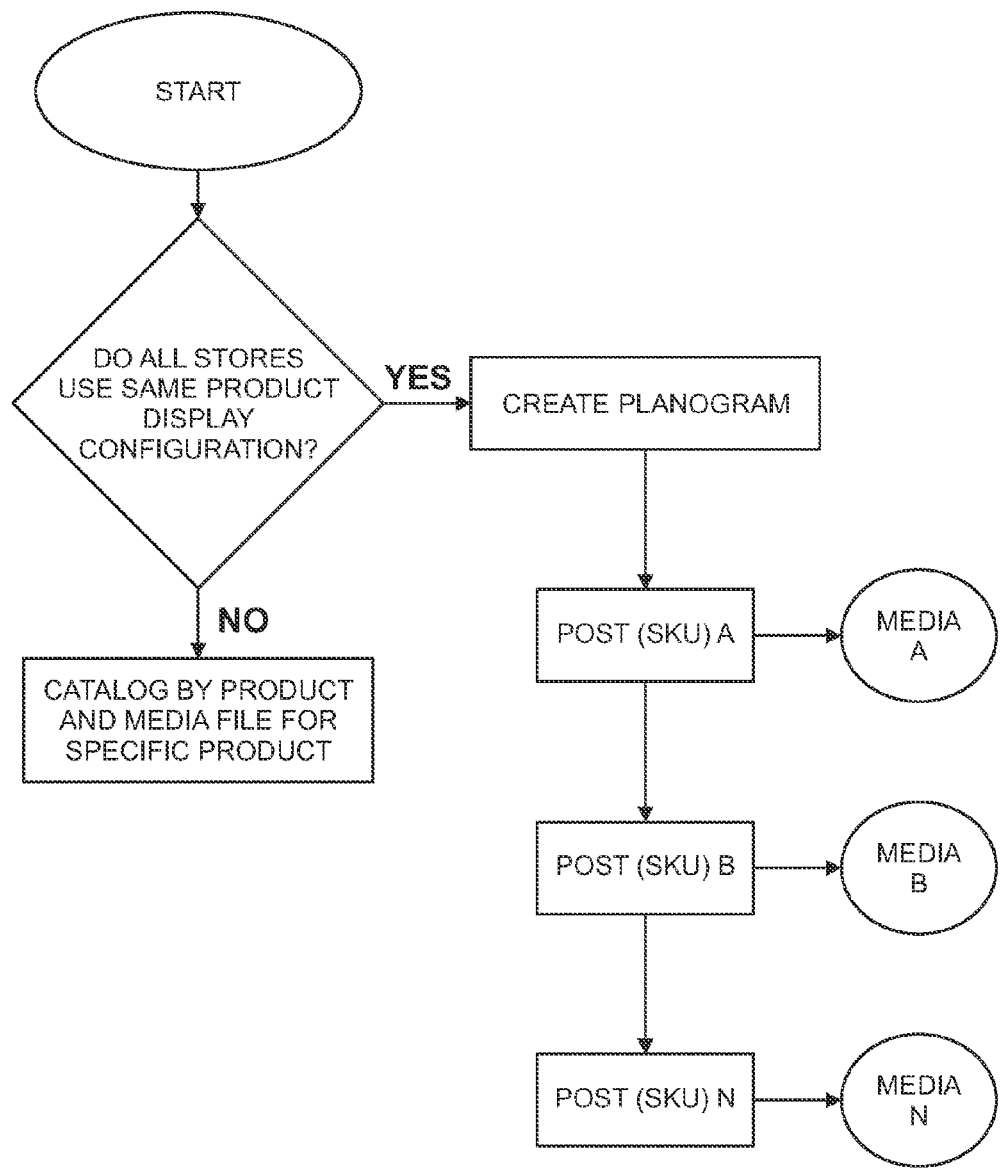
FIG. 25 is a flow chart like FIG. 24.
Figure 26:
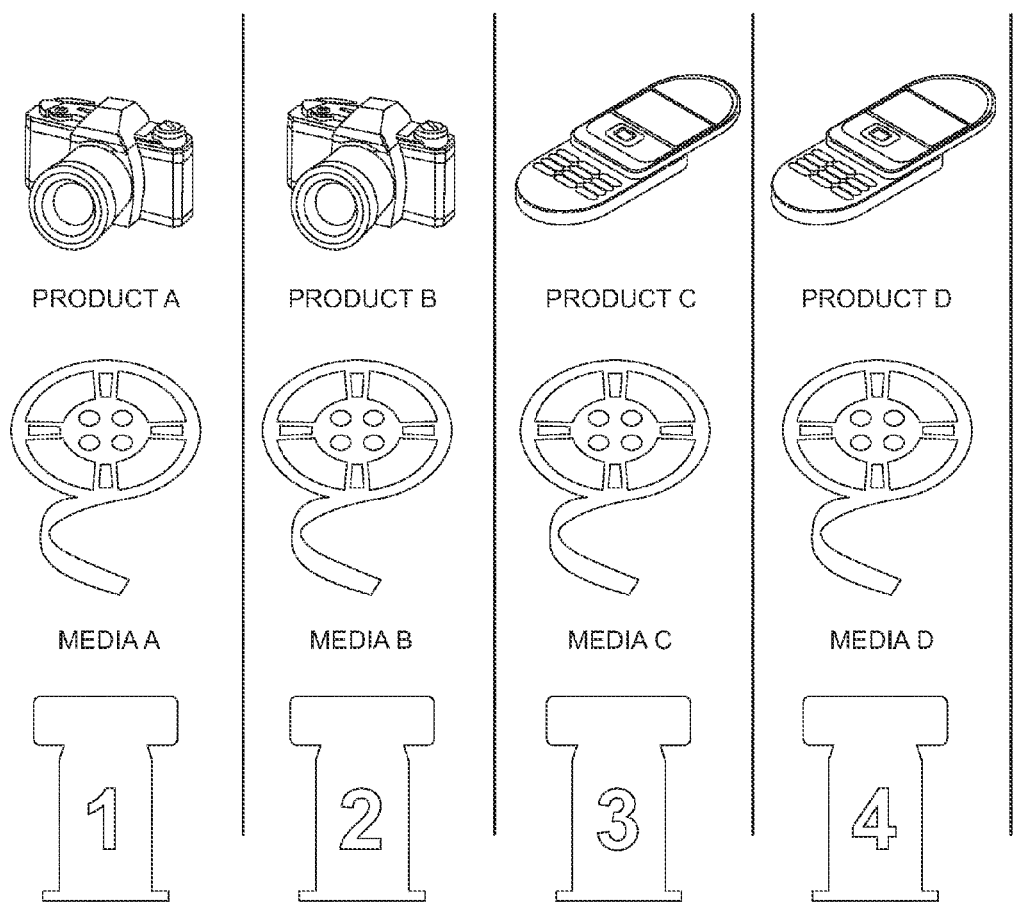
FIG. 26 illustrates how variable media content is developed for independent post positions.

An advantage to the system is that it is possible to interface a display at any particular store with media content that is created off-site and provided via the internet or other means, as indicated at 148. In this way, and for large retailers who will have their own media departments, in particular, the retailer may assemble media content 150 at a separate corporate location and transmit it to individual displays (at different store locations) from media storage 152. This may be accomplished in different ways that include either adjusting content on a per post basis or generically mapping out ("planogram") all post positions at the same time. With respect to the latter concept, some retailers may install identical displays having the same arrangement and number of post positions, monitors, etc. at a variety of stores. In situations of this kind, it is possible to develop generic plans, as shown at FIG. 26, where the retailer or supplier can create a media plan that selectively controls all the post positions. At the same time, the salesperson is simply instructed as to which hand-held device model needs to be installed in a certain position. In other words, a central corporate location can provide a single sheet or sheets of instructions for its display that tell the salesperson nothing more than what type of camera and power adaptor cable (between camera and puck) needs to be put at each post position. Thereafter, media content is supplied automatically via the internet or the like. FIGS. 24-25 generally indicate the control logic for the system just described.

Figure 12:
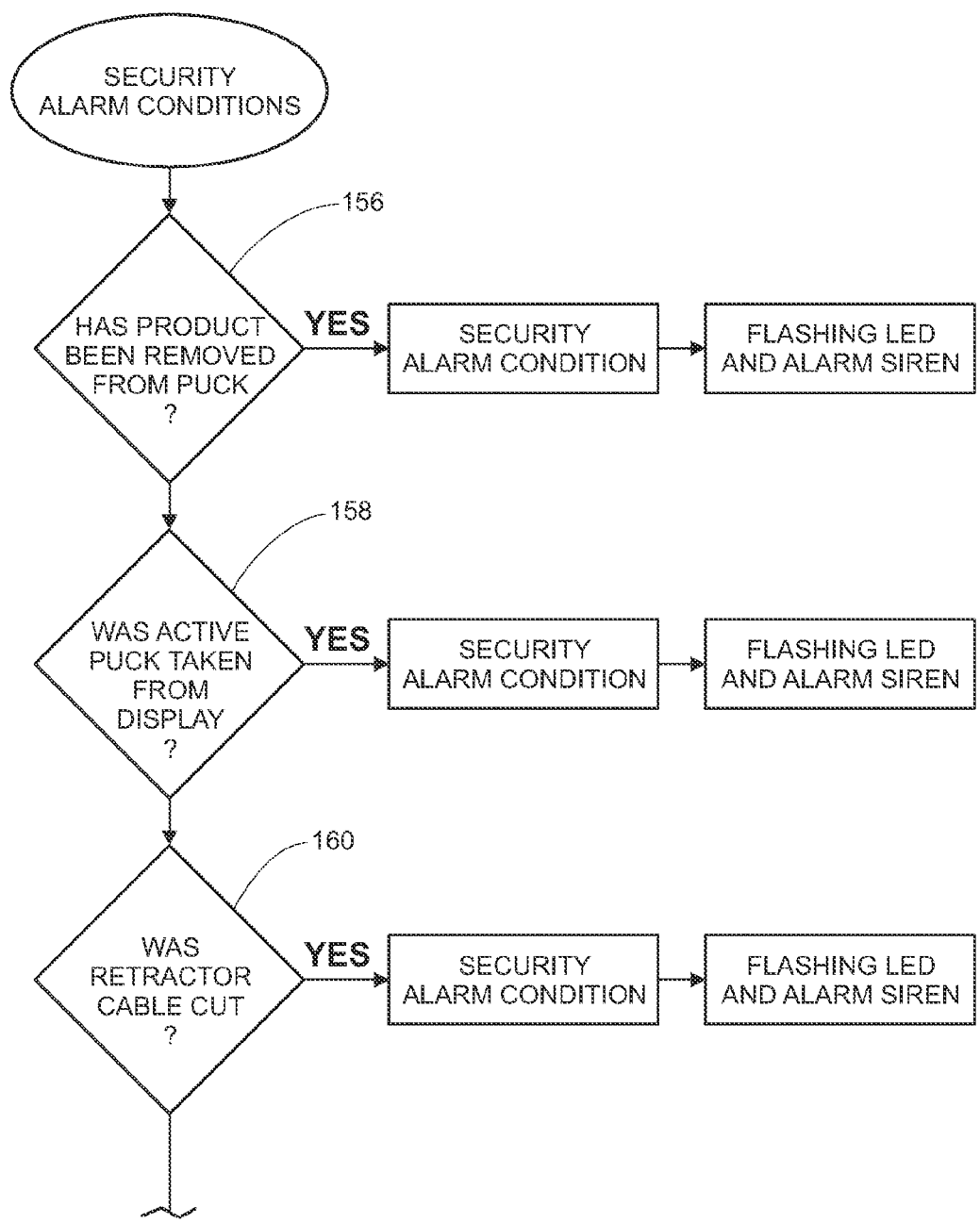
FIG. 12 is a flow chart explaining security alarm conditions.
Figure 13:
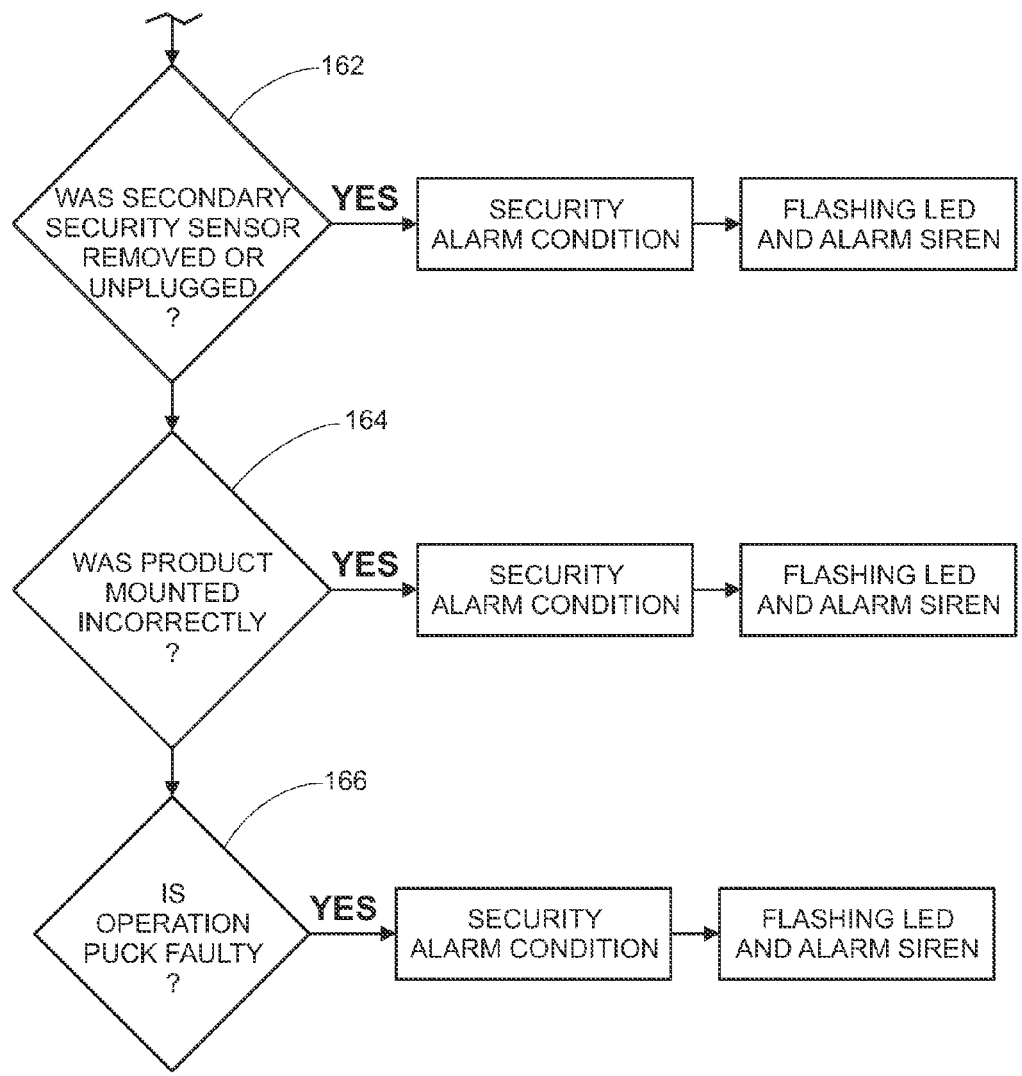
FIG. 13 is a continuation of FIG. 12.

Next, returning to FIG. 22, in preferred form, each puck assembly 14 will carry a light ring 154 that can be used to visually output certain kinds of security alarm conditions or other alerts. For example, each light ring position 154 may output different flashing sequences that are triggered by different security breach events. Referring to FIGS. 12 and 13, for example, the light rings may be programmed to flash by certain events such as product being removed from the puck (156); an active puck being removed from the display (158); cutting of the mechanical retractor cable (160); removal of the secondary or other security sensors (162); incorrect product mounting (164); or other kinds of indicia of faulty puck operation (166). FIGS. 12-13 illustrate the flowchart logic for implementing the system. Audio alarms may be triggered at the same time as a flashing light ring. It is to be appreciated that, in accordance with the design described here, the light ring is built into the puck assembly. Therefore, it may be driven by the ECB battery 82 (previously described).

Finally, the light ring system 154 may also be used to indicate a wide variety of alerts that communicate whether each post position is operating correctly. These alerts may range from steady light output at each post position (indicating the puck assembly 14 is armed and charging at that post position when at rest) or no light (indicating lack of power) different kinds of flashing and/or alarm siren cycles may also be used to indicate different kinds of alert conditions, as reflected in FIGS. 15-18.

It is to be appreciated that the foregoing description sets forth the best known examples and embodiments. It is not intended that any of the foregoing description be used to limit the scope of the patent protection. Instead, all patent protection is to be defined solely by the patent claim or claims that follow this description, the interpretation of which is to be made according to the legal rules of patent claim interpretation and the rules and regulations of the U.S. Patent and Trademark Office.

What is claimed is:

1. A cable management apparatus for use in mounting one of a plurality of electronic devices to a display, including:
   a mounting member adapted to carry an electronic device, wherein the mounting member may be lifted and returned to a resting position on the display, and further, the mounting member is electrically connected to at least one source module and receives at least one electrical signal at least when the mounting member is in the resting position;
   an electronics board carried by the mounting member, the electronics board carrying security circuitry, with the electronics board being adapted to pass at least a portion of the at least one electrical signal to the electronic device and another portion of the at least one electrical signal to the security circuitry carried by the electronics board, and wherein the security circuitry carried by the electronics board is adapted to create a wirelessly transmitted security condition signal that originates from the location of the mounting member; and
   a secondary security sensor cable assembly for electrically coupling the electronic device to the mounting member, the secondary security sensor cable assembly being connected to the security circuitry carried by the electronics board.

2. The cable management apparatus of claim 1, including a tether cable assembly that includes a retractable cable connected to the mounting member for tethering the mounting member to the display.

3. The cable management apparatus of claim 2, wherein the retractable cable is a mechanical cable, and further, the mounting member is connected to receive the electrical signal by a wire-to-wire connection when the mounting member is in the resting position, and wherein the wire-to-wire connection is broken when the mounting member is lifted from the resting position.

4. The cable management apparatus of claim 3, wherein the security circuitry is adapted to use the retractable cable as an antenna for wirelessly transmitting the security condition signal.

5. The cable management apparatus of claim 3, including: a battery carried by the mounting member that is charged by the at least one electrical signal, the battery being adapted to operate the security circuitry when the wire-to-wire connection is broken.

6. The cable management apparatus of claim 1, including: an adaptor cable assembly for electrically coupling the electronic device to the mounting member, the adaptor cable assembly being characterized in that the adaptor cable assembly adjusts the voltage of the at least one electrical signal to match the operating voltage of the electronic device.

7. A cable management apparatus for use in mounting one of a plurality of electronic devices to a display, including:
   a mounting member adapted to carry an electronic device, wherein the mounting member may be lifted and returned to a resting position on the display, and further, the mounting member is electrically connected to at least one source module and receives at least one electrical signal from the source module at least when the mounting member is in the resting position, and further, the mounting member is connected to receive the electrical signal by a wire-to-wire connection when the mounting member is in the resting position, and wherein the wire-to-wire connection is broken when the mounting member is lifted from the resting position;
   an adaptor cable assembly for electrically coupling the electronic device to the mounting member, the adaptor cable assembly being characterized in that the adaptor cable assembly adjusts the voltage of the at least one electrical signal to match the operating voltage of the electronic device; and
   a secondary security sensor cable assembly for electrically coupling the electronic device to the mounting member, the secondary security sensor cable being operable to generate a security condition signal; and
   a means for operating the secondary security sensor cable when the wire-to-wire connection is broken.

\* \* \* \* \*